United States Patent
Cederlund et al.

(10) Patent No.: US 10,324,528 B2
(45) Date of Patent: *Jun. 18, 2019

(54) SYSTEM FOR GAZE INTERACTION

(71) Applicant: Tobii AB, Danderyd (SE)

(72) Inventors: Markus Cederlund, Sollentuna (SE); Robert Gavelin, Akerberga (SE); Anders Vennström, Stockholm (SE); Anders Kaplan, Uppsala (SE); Anders Olsson, Stockholm (SE); Mårten Skogö, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,049

(22) Filed: May 21, 2018

(65) Prior Publication Data

US 2018/0335838 A1     Nov. 22, 2018

Related U.S. Application Data

(63) Continuation of application No. 13/646,299, filed on Oct. 5, 2012, now Pat. No. 10,013,053.

(Continued)

(51) Int. Cl.
  G06F 3/01     (2006.01)
  G06F 3/0488   (2013.01)
  (Continued)

(52) U.S. Cl.
  CPC .............. G06F 3/013 (2013.01); B60K 37/06 (2013.01); G02B 27/01 (2013.01); G02B 27/017 (2013.01);
  (Continued)

(58) Field of Classification Search
  None
  See application file for complete search history.

(56) References Cited

U.S. PATENT DOCUMENTS 5,859,642 A    1/1999  Jones
6,204,828 B1   3/2001  Amir et al.
(Continued)

FOREIGN PATENT DOCUMENTS

EP    2445182 A2    4/2012
EP    2503479 A1    9/2012
(Continued)

OTHER PUBLICATIONS

U.S. Appl. No. 14/601,007, Non-Final Office Action dated Aug. 23, 2017, 21 pages.
(Continued)

*Primary Examiner* — Jennifer Mehmood
*Assistant Examiner* — Parul H Gupta
(74) *Attorney, Agent, or Firm* — Kilpatrick Townsend & Stockton LLP

(57) ABSTRACT

A method and system for assisting a user when interacting with a graphical user interface combines gaze based input with gesture based user commands. A user of a computer system without a traditional touch-screen can interact with graphical user interfaces in a touch-screen like manner using a combination of gaze based input and gesture based user commands. A solution for touch-screen like interaction uses gaze input and gesture based input as a complement or an alternative to touch-screen interactions with a computer device having a touch-screen. Combined gaze and gesture based interaction with graphical user interfaces can be used to achieve a touch-screen like environment in computer systems without a traditional touchscreen or in computer systems having a touchscreen arranged ergonomically unfavorable for the user or a touchscreen arranged such that it is more comfortable for the user to use gesture and gaze for the interaction than the touchscreen.

20 Claims, 20 Drawing Sheets

Related U.S. Application Data

(60) Provisional application No. 61/583,013, filed on Jan. 4, 2012.

(51) Int. Cl.
  *G02B 27/01* (2006.01)
  *B60K 37/06* (2006.01)
  *G06F 1/16* (2006.01)

(52) U.S. Cl.
  CPC ............ *G06F 1/1613* (2013.01); *G06F 3/014* (2013.01); *G06F 3/017* (2013.01); *G06F 3/04883* (2013.01); *G02B 2027/014* (2013.01); *G02B 2027/0187* (2013.01); *G06F 2203/0381* (2013.01)

(56) References Cited

U.S. PATENT DOCUMENTS

| | | |
|---|---|---|
| 7,572,008 B2 | 8/2009 | Elvesjo et al. |
| 8,235,529 B1 | 8/2012 | Raffle et al. |
| 8,922,480 B1 | 12/2014 | Freed et al. |
| 9,147,248 B2 | 9/2015 | Kaplan |
| 9,274,598 B2 | 3/2016 | Beymar |
| 2004/0138849 A1 | 7/2004 | Schmidt |
| 2005/0243054 A1 | 11/2005 | Beymar et al. |
| 2006/0132382 A1 | 6/2006 | Jannard |
| 2009/0273562 A1 | 11/2009 | Priya et al. |
| 2010/0277428 A1 | 11/2010 | Kumazawa |
| 2010/0313110 A1 | 12/2010 | Claridge et al. |
| 2011/0012848 A1 | 1/2011 | Li |
| 2011/0202842 A1 | 8/2011 | Weatherly |
| 2011/0260962 A1 | 10/2011 | Benko et al. |
| 2012/0019662 A1 | 1/2012 | Maltz |
| 2012/0039505 A1* | 2/2012 | Bastide .................. G06F 3/012 382/103 |
| 2012/0262582 A1 | 10/2012 | Kimchi et al. |
| 2012/0272179 A1* | 10/2012 | Stafford .................. G06F 3/012 715/781 |
| 2013/0283213 A1 | 10/2013 | Guendelman |
| 2013/0325922 A1 | 12/2013 | Chaudhri |
| 2014/0043227 A1 | 2/2014 | Skogo |
| 2014/0049452 A1 | 2/2014 | Maltz |
| 2014/0268054 A1 | 9/2014 | Olsson et al. |
| 2014/0313307 A1 | 10/2014 | Oh et al. |
| 2015/0130740 A1 | 5/2015 | Cederlund et al. |
| 2015/0185835 A1 | 7/2015 | Ma et al. |
| 2015/0269009 A1 | 9/2015 | Faaborg |
| 2015/0309566 A1 | 10/2015 | Hampiholi |
| 2016/0216761 A1 | 7/2016 | Klingström et al. |
| 2016/0109947 A1 | 8/2016 | George-Svahn et al. |
| 2017/0090566 A1 | 3/2017 | George-Svahn et al. |
| 2017/0123489 A1 | 5/2017 | Guenter |
| 2017/0235360 A1 | 8/2017 | George-Svahn |

FOREIGN PATENT DOCUMENTS

| | | |
|---|---|---|
| EP | 3187976 A2 | 7/2017 |
| EP | 3187977 A1 | 7/2017 |

OTHER PUBLICATIONS

U.S. Appl. No. 15/379,233, Non-Final Office Action dated Oct. 5, 2017, 25 pages.
U.S. Appl. No. 14/601,007, Advisory Action dated Mar. 7, 2017, 4 pages.
U.S. Appl. No. 14/601,007, Final Office Action dated Dec. 7, 2016, 14 pages.
U.S. Appl. No. 14/601,007, Non-Final Office Action dated Jun. 2, 2016, 17 pages.
U.S. Appl. No. 14/985,954, Final Office Action dated May 12, 2017, 20 pages.
U.S. Appl. No. 14/985,954, Non-Final Office Action dated Aug. 31, 2016, 16 pages.
U.S. Appl. No. 15/087,571, Final Office Action dated Feb. 9, 2017, 20 pages.
U.S. Appl. No. 15/087,571, Non-Final Office Action dated May 12, 2016, 18 pages.
U.S. Appl. No. 15/444,035, Non-Final Office Action dated Jul. 6, 2017, 9 pages.
European Application No. 16207629.3, Extended European Search Report dated May 12, 2017, 7 pages.
European Application No. 16207625.1, Extended European Search Report dated Aug. 14, 2017, 11 pages.
PCT/US2018/019447 received an International Search Report and Written Opinion, dated May 23, 2018.
U.S. Appl. No. 15/087,571 received a Final Office Action, dated Sep. 6, 2018.
U.S. Appl. No. 15/087,571 received a Non-Final Office Action, dated Sep. 6, 2018.
U.S. Appl. No. 15/379,233 received a Final Office Action, dated Sep. 6, 2018.
U.S. Appl. No. 15/379,233 received a Non-Final Office Action, dated Nov. 19, 2018.
U.S. Appl. No. 16/008,577 received a Non-Final Office Action, dated Sep. 19, 2018.
U.S. Appl. No. 14/985,954 received a Non-Final Office Action dated Sep. 19, 2018.
U.S. Appl. No. 14/601,007 received a Notice of Allowance, dated May 14, 2018, 12 pgs.

\* cited by examiner

SYSTEM FOR GAZE INTERACTION

FIELD OF THE INVENTION

This application is a continuation of U.S. Non-Provisional application Ser. No. 13/646,299 filed on Oct. 5, 2012, which claims the benefit of U.S. Provisional Application No. 61/583,013 filed on Jan. 4, 2012, the entire contest of which are hereby incorporated by reference.

FIELD OF THE INVENTION

The invention generally relates to computer implemented systems and methods for utilizing detection of eye movements in connection with interactive graphical user interfaces. In particular, the present invention relates to systems and methods for assisting a user when interacting with a graphical user interface by combining eye based input with gesture based input and gesture based user commands.

BACKGROUND

Human computer interaction has been revolutionized by the introduction of the graphical user interface (GUI). Thereby, an efficient means was provided for presenting information to a user with a bandwidth that immensely exceeded any prior channels. Over the years the speed at which information can be presented has increased further through color screens, enlarged displays, intelligent graphical objects (e.g. pop-up windows), window tabs, menus, toolbars, etc. During this time, however, the input devices have remained essentially unchanged, i.e. the keyboard and the pointing device (e.g. the mouse, track ball or touchpad). In recent years, handwriting devices have been introduced (e.g. in the form of a stylus or graphical pen). Nevertheless, while output bandwidth has multiplied several times, the input bandwidth has been substantially unchanged. Consequently, a severe asymmetry in the communication bandwidth in the human computer interaction has developed.

In order to decrease this bandwidth asymmetry as well as to improve and facilitate the user interaction, various attempts have been made to use eye-tracking for such purposes. By implementing an eye tracking device in e.g. a laptop, the interaction possibilities between the user and the different software applications run on the computer can be significantly enhanced.

Hence, one interesting idea for improving and facilitating the user interaction and for removing the bandwidth asymmetry is to use eye gaze tracking instead or as a complement to mouse input. Normally, the cursor is positioned on the display according to the calculated point of gaze of the user. A number of different techniques have been developed to select and activate a target object in these systems. In one example, the system activates an object upon detection that the user fixates his or her gaze at a certain object for a certain period of time. Another approach is to detect an activation of an object when the user's eye blinks.

However, there are problems associated with these solutions using eye tracking. For example, the humans use their eye in perceptive actions instead of controlling. Therefore, it may be stressful to carefully use eye movements to interact with a computer, for example, to activate and select an object presented on the display of the computer. It may also be difficult to control blinking or staring in order to interact with objects presented on a display.

Thus, there is a need within the art for improved techniques that enable user interaction with a computer provided with an eye tracking device allowing the user to control, select and activate objects and parts of objects presented on a display of the computer using his or her eyes in a more intuitive and natural way. Furthermore, there is also a need within the art for techniques that in a more efficient way takes advantage the potential of using eye tracking for improving and facilitating the user interaction with a computer.

One such attempt is presented in US pat. appl. (publication number 2005/0243054) to Beymer et al. in which a technology for selecting and activating a target object using a combination of eye gaze and key presses is disclosed. More specifically, a user looks at a target object, for example, a button on a graphical user interface and then presses a selection key of the keyboard. Once the selection key is pressed, a most probable target is determined using probability reasoning. The determined target object is then highlighted and the user can select it by pressing the selection key again. If the highlighted object is not the target object, the user can select another target object using additional keys to navigate to the intended target object.

However, this technology is limited to object selection and activation based on a combination of eye gaze and two sequential presses of one dedicated selection key.

In U.S. Pat. No. 6,204,828 to Amir et al., a computer-driven system for aiding a user to positioning a cursor by integrating eye gaze and manual operator input is disclosed. A gaze tracking apparatus monitors the eye orientation of the user while the user views a screen. Concurrently, the computer monitors an input device, such as a mouse, for mechanical activation by the operator. When the computer detects mechanical activation of the input device, it determined an initial cursor display position within a current gaze area. The cursor is then displayed on the screen at the initial display position and thereafter the cursor is positioned manually according to the user's handling of the input device without regard to the gaze.

Consequently, there still remains a need within the art of an improved technique that in a more efficient way takes advantage of the potential in using eye tracking for improving and facilitating the user interaction with a computer and in particular user interaction with graphical user interfaces.

SUMMARY

An object of the present invention is to provide improved methods, devices and systems for assisting a user when interacting with a graphical user interface by combining gaze based input with gesture based user commands.

Another object of the present invention is to provide methods, devices and systems for user friendly and intuitive interaction with graphical user interfaces.

A particular object of the present invention is to provide systems, devices and methods that enable a user of a computer system without a traditional touch-screen to interact with graphical user interfaces in a touch-screen like manner using a combination of gaze based input and gesture based user commands. Furthermore, the present invention offers a solution for touch-screen like interaction using gaze input and gesture based input as a complement or an alternative to touch-screen interactions with a computer device having a touch-screen, such as for instance in situations where interaction with the regular touch-screen is cumbersome or ergonomically challenging.

Another particular object of the present invention is to provide systems, devices and methods for combined gaze and gesture based interaction with graphical user interfaces to achieve a touchscreen like environment in computer systems without a traditional touchscreen or in computer systems having a touchscreen arranged ergonomically unfavorable for the user or a touchscreen arranged such that it is more comfortable for the user to use gesture and gaze for the interaction than the touchscreen.

In the context of the present invention, the term "GUI" (Graphical User Interface) refers to a graphics-based user interface with pictures or images and words (including e.g. signs and figures) on a display that incorporate, for example, movable windows and icons.

Further, in the context of the present invention the terms "object" or "object part" refer to an interactive graphical object or GUI object such as a window, an icon, a button, a scroll bar, a hyperlink, or non-interactive objects such as an image, text or a word in a text that the user desires to select or activate.

In the context of the present invention, the term "touchpad" (or the term "trackpad") refers to a surface sensor for detecting the position and movement of one or multiple fingers and/or one or multiple other objects intended for pointing, drawing or making gestures, such as for instance a stylus.

These and other objects of the present invention are achieved by means of a system having the features defined in the independent claims. Embodiments of the invention are characterized by the dependent claims.

According to an aspect of the present invention, there is provided a control module for implementation in, for example, a computer device or handheld device or a wireless transmit/receive unit (WTRU) for handling and generating gesture based control commands to execute user action based on these commands. The control module is configured to acquire user input from input means adapted to detect user generated gestures and gaze data signals from a gaze tracking module and to determine at least one user generated gesture based control command based on the user input. Further, the control module is configured to determine a gaze point area on the information presentation area including the user's gaze point based on at least the gaze data signals and to execute at least one user action manipulating a view presented on the graphical information presentation area based on the determined gaze point area and at least one user generated gesture based control command, wherein the user action is executed with the determined gaze point area as a starting point. The gaze point area serving as a starting point may be an area at which the user initially gazes at or a fine tuned area, i.e. an area that the user has selected by tuning or correcting commands via, for example, the input means, thereby correcting or tuning an initial gaze point area to a selected area.

According to another aspect of the present invention, there is provided a method for generating gesture based commands during user interaction with an information presentation area, for example, associated with or included in a computer device or handheld device, or associated with or included in a wireless transmit/receive unit (WTRU). The method comprises acquiring user input corresponding to user generated gestures and gaze data signals and determining at least one user generated gesture based control command based on the user input. Further, a gaze point area on the information presentation area including the user's gaze point is determined based on at least the gaze data signals and at least one user action manipulating a view presented on the information presentation area is executed based on the determined gaze point area and at least one user generated gesture based control command, wherein the user action is executed with the determined gaze point area as a starting point.

According to a further aspect of the present invention, there is provided a handheld portable device provided with or associated with an information presentation area and comprising input means adapted to detect user generated gestures and a gaze tracking module adapted to detect gaze data of a viewer of the information presentation area. The handheld device further comprises a control module configured to acquire user input from the input means and gaze data signals from the gaze tracking module and to determine at least one user generated gesture based control command based on the user input. The control module is further configured to determine a gaze point area on the information presentation area including the user's gaze point based on at least the gaze data signals and to execute at least one user action manipulating a view presented on the information presentation area based on the determined gaze point area and at least one user generated gesture based control command, wherein the user action is executed with the determined gaze point area as a starting point. In embodiments of the present invention, the handheld device may be a cellular phone, a smartphone, an iPad or similar device, a tablet, a phoblet/phablet, a laptop or similar device.

According to a further aspect of the present invention, there is provided a wireless transmit/receive unit, WTRU, associated with an information presentation area and comprising input means adapted to detect user generated gestures and a gaze tracking module adapted to detect gaze data of a viewer of the information presentation area. The WTRU further comprises a control module configured to acquire user input from the input means and gaze data signals from the gaze tracking module and to determine at least one user generated gesture based control command based on the user input. The control module is further configured to determine a gaze point area on the information presentation area including the user's gaze point based on at least the gaze data signals and to execute at least one user action manipulating a view presented on the information presentation area based on the determined gaze point area and at least one user generated gesture based control command, wherein the user action is executed with the determined gaze point area as a starting point.

The term "wireless transmit/receive unit (WTRU)" include but is not limited to a user equipment (UE), a mobile station, a fixed or mobile subscriber unit, a cellular telephone, a smartphone, a personal digital assistant (PDA), a computer, or any other type of device capable of operating in a wireless environment such as a wireless local area network (WLAN) or wireless mobile communication system (e.g. a third generation (3G) global system for mobile communication and systems for mobile communication including long term evolution (LTE) cells).

According to another aspect of the present invention, there is provided a system for user interaction with an information presentation area. The system comprises input means adapted to detect user generated gestures and a gaze tracking module adapted to detect gaze data of a viewer of the information presentation area. Further, the system includes a control module configured to acquire user input from the input means and gaze data signals from the gaze tracking module and to determine at least one user generated gesture based control command based on the user input. The control module is further configured to determine a gaze point area on the information presentation area where the user's gaze point is located based on at least the gaze data signals and to execute at least one user action manipulating a view presented on the graphical information presentation area based on the determined gaze point area and at least one user generated gesture based control command, wherein the user action is executed with the determined gaze point area as a starting point.

According to yet another aspect of the present invention, there is provided a computer device associated with an information presentation area. The computer device comprises input means adapted to detect user generated gestures and a gaze tracking module adapted to detect gaze data of a viewer of the information presentation area. The computer device further comprises a control module configured to acquire user input from input means adapted to detect user generated gestures and gaze data signals from a gaze tracking module and to determine at least one user generated gesture based control command based on the user input. Moreover, the control module is configured to determine a gaze point area on the information presentation area including the user's gaze point based on at least the gaze data signals and to execute at least one user action manipulating a view presented on the information presentation area based on the determined gaze point area and at least one user generated gesture based control command, wherein the user action is executed with the determined gaze point area as a starting point.

According to embodiments of the present invention, the computer device may, for example, be any one from the group of a personal computer, computer workstation, mainframe computer, a processor or device in a vehicle, or a handheld device such as a cell phone, smartphone or similar device, portable music player (such as e.g. an iPod), laptop computers, computer games, electronic books, an iPAD or similar device, a Tablet, a Phoblet/Phablet.

According to embodiments of the present invention, the input means is configured to detect user gestures by a hand or a finger (or fingers), for example, relative a keyboard or an information presentation area using, for example, an optical measurement technique or capacitive measurement technique.

According to an aspect of the present invention, there is provided a system for user interaction with a wearable head mounted information presentation area. The system comprises input means configured as a gyro ring adapted to detect user generated gestures and adapted to wirelessly communicate with a control module also communicatively connected to the information presentation area as well as a gaze tracking module adapted to detect gaze data of a viewer of the information presentation area. A control module configured to: acquire user input from the input means and gaze data signals from the gaze tracking module; determine at least one user generated gesture based control command based on the user input; determine a gaze point area on the information presentation area including the user's gaze point based on at least the gaze data signals; and execute at least one user action manipulating a view presented on the graphical information presentation area based on the determined gaze point area and at least one user generated gesture based control command, wherein the user action is executed with the determined gaze point area as a starting point.

According to a further aspect of the present invention, there is provided a system for user interaction with an information presentation area. The system comprises input means adapted to detect user generated gestures, wherein the input means comprising at least one touchpad arranged on a steering device of a vehicle or adapted to be integrated in a steering device of a vehicle. Further, the system comprises a gaze tracking module adapted to detect gaze data of a viewer of the information presentation area and a control module configured to: acquire user input from the input means and gaze data signals from the gaze tracking module; determine at least one user generated gesture based control command based on the user input; determine a gaze point area on the information presentation area including the user's gaze point based on at least the gaze data signals; and execute at least one user action manipulating a view presented on the graphical information presentation area based on the determined gaze point area and at least one user generated gesture based control command, wherein the user action is executed with the determined gaze point area as a starting point.

According to embodiments of the present invention, the input means includes a touchpad configured to enable a user to generate gesture based control commands. The gesture based commands can for example be generated by moving at least one finger over a surface of the touchpad or touching a surface of the touchpad with, for example, the finger.

According to embodiments of the present invention, a dedicated part or area of the touchpad surface is configured to receive gesture based control commands.

According to embodiments of the present invention, at least a first dedicated part or area of the touchpad surface is configured to receive a first set of gesture based control commands and at least a second part or area of the touchpad surface is configured to receive a second set of gesture based control commands. For example, the touchpad may be configured to receive gestures such as scrolling or zooming at a dedicated area or part.

In embodiments of the present invention, the control module is configured to determine at least one gesture based control command based on multiple simultaneous user input via the input means. Further, a gaze point area on the information presentation area where the user's gaze point is located is determined based on the gaze data signals and at least one user action manipulating a view presented on the graphical information presentation area is executed based on the determined gaze point area and the at least one gesture based control command, wherein the user action is executed with the determined gaze point area as a starting point.

According to embodiments of the present invention, an input module is configured to interpret signals representing at least one user generated gesture to provide at least one gesture based control command reflecting a user's gesture. According to embodiments of the present invention, the input module is arranged in the control module.

In embodiments of the present invention, the input module is configured to interpret the signals representing the at least one user generated gesture using gaze input signals and/or a predetermined set of possible gesture based control commands, each possible control command corresponding to a particular user gesture relative the input means.

According to embodiments of the present invention, at least one object is presented on the graphical information presentation area, the object representing at least one graphical user interface component and configured to be manipulated based on the user-generated gesture based control commands, wherein the control module is configured to determine if the gaze point of the user is on an object or in an area surrounding that object based on the gaze data signals. Further, the control module may be configured to determine if the gaze point of the user has been on an object or in an area surrounding that object at a predetermined point in time based on the gaze data signals. For example, the control module may be configured to determine if the gaze point of the user was on an object or the area surrounding that object 0.1 seconds ago.

User activation of the object is enabled if the user's gaze point is on or within an area surrounding that object synchronized with a user generated activation command resulting from user input via the input means, wherein the activated object can be manipulated by user generated commands resulting from user input via the input means. User activation of the object may also be enabled if the user's gaze point was on or within an area surrounding that object at the predetermined period of time synchronized with a user generated activation command resulting from user input via the input means, wherein the activated object can be manipulated by user generated commands resulting from user input via the input means.

According to embodiments of the present invention, when the user touches the touchpad, the location of the initial gaze point is indicated by a visual feedback, such as a crosshairs or similar sign. The user may adjust this initial location by moving the finger on the touchpad. Then, the user may, in a touchscreen like manner, interact with the information presentation area using different gestures. The strength of the visual feedback, e.g. the strength of the light of a crosshairs, may be dependent on where the user's gaze is located on the information presentation area. For example, if a dragging operation to pan a window is initiated at the gaze point, the visual feedback may initially be discrete. When the dragging operation has been maintained for a period, the visual feedback can be strengthened to indicate for the user where the dragging operation is performed at the moment.

In the embodiments including a touchpad, the gestures are finger movements relative the touchpad and each gesture is associated with or corresponds to a particular gesture based control command resulting in a user action. Below, a non-exhaustive number of examples of user actions that can be executed using a combination of gestures and gaze are discussed:

By gazing, for example, at an object presented on the information presentation area and by, in connection to this, pressing down and holding a finger on the touchpad during a predetermined period of time, a visual feedback related to that object is presented. For example, by pressing down and holding the finger on the touchpad during a first period of time, the object may be highlighted and, by continue to hold the finger on the touchpad for a second period of time, an information box presenting information regarding the object may be displayed.

By gazing, for example, at an object presented on the information presentation area and by in connection to this tapping on the touchpad using a finger, a primary action can be initiated. For example, an application can be opened and started by gazing at an icon representing the application and tapping on the touchpad using a finger.

By gazing, for example, at an object presented on the information presentation area and by, in connection to this, lifting a finger (or fingers) that have been in contact with the touchpad, a primary action can be initiated. For example, an application can be opened and started by gazing at an icon representing the application and lifting a finger (or fingers) that have been in contact with the touchpad.

The user may slide or drag the view presented by the information presentation area by gazing at the information presentation area and by, in connection to this, sliding his or her finger over the touchpad. The dragging is then initiated at the gaze point of the user. A similar action to slide an object over the information presentation area can be achieved by gazing at the object and by, in connection to this, sliding the finger over the touchpad. Both of these objectives may instead be implemented in a way where two fingers are required to do the swipe, or one finger is used for swiping while another finger holds down a button.

The user may select an object for further actions by gazing at the object and by, in connection to this, swiping his or her finger downwards on the touchpad.

By gazing at an object or object part presented on the information presentation area and by, in connection to this, pinching with two of his or hers finger, it is possible to zoom that object or object part. The same function can be implemented also on a touchpad only able to sense single touch by having for instance the thumb push a button or keyboard key and the finger moving on the touchpad away from, or towards, the button or keyboard key.

By gazing at an object or object part presented on the information presentation area and by, in connection to this, rotating with two of his or hers finger, it is possible to rotate that object or object part. Similarly, when using a touchpad only able to sense single touch the thumb can press a button while a finger moves on the touchpad in a curve at a constant distance from the button to rotate an object.

By gazing at an edge of the information presentation area and sliding the finger over the touchpad in the direction that would have been towards the center of the information presentation area if the gesture had been done at the gaze position, a menu or other window hidden during normal use, such as a help menu, can be presented or displayed. That is, a hidden menu or other window can be displayed or presented if the user gazes at, for example, the left edge of the information presentation area and swipes his or her finger over the touchpad in the right direction.

By gazing at a slider control, for example a volume control, the finger can be moved up/down (or left/right for a horizontal control) on the touch pad, on a predefined area of a touch screen or above a keyboard to adjust the value of the slider control.

By gazing at a checkbox control while doing a "check-gesture" (such as a "V") on the touchpad, the checkbox can be checked or unchecked.

By gazing at a zoomable object or object part presented on the information presentation area and while pressing hard on a pressure sensitive touchpad with one finger (e.g. one of the thumbs), it is possible to zoom in or out on said object using the gaze point as the zoom center point, where each hard press toggles between different zoom levels.

By gazing at an object or object part where several options are available, for example "copy" or "rename", the different options can be displayed on different sides of the object after a preset focusing dwell time has passed or after appropriate user input has been provided.

The touchpad or a predefined area of a touch screen is thereafter used to choose action. For example, slide left to copy and slide right to rename.

According to another embodiment of the present invention, the gaze tracking module and the user input means are implemented in a touchscreen provided device such as an iPad or similar device. The touchscreen functions both as information presentation area and input device for input of user gestures. A control module is included in the touchscreen provided device and is configured to determine a gaze point area on the information presentation area, i.e. the touchscreen, where the user's gaze point is located based on the gaze data signals and to execute at least one user action manipulating a view presented on the touchscreen based on the determined gaze point area and at least one user generated gesture based control command, wherein the user action is executed with the determined gaze point area as a starting point. The user gestures are inputted via the touchscreen. According to this embodiment, the user gestures, or finger movements on the touchscreen, are relative to the gaze point, which entails a more user friendly and ergonomic use of touchscreen provided devices. For example, the user may hold the device with both hands and interact with graphical user interfaces on the touchscreen using the gaze and movement of the thumbs, where all user actions and activations have the gaze point of the user as starting point.

As mentioned, the gesture and gaze initiated actions discussed above are only exemplary and there are a large number of further gestures in combination with gaze point resulting in an action that are conceivable. Below, some further examples are described:

Selection of an object or object part can be made by gazing at that object or object part and pressing a finger (e.g. a thumb), fine tuning by moving the finger and releasing the pressure applied by the finger to select that object or object part;

Selection of an object or object part can be made by gazing at that object or object part, pressing a finger (e.g. a thumb), fine tuning by moving the finger, using another finger (e.g. the other thumb) to tap for selecting that object or object part. In addition, a double tap may be used for a "double click action" and a quick downward movement may be used for a "right click".

By gazing at a zoomable object or object part presented on the information presentation area while moving a finger (e.g. one of the thumbs) in a circular motion, it is possible to zoom in or out of said object using the gaze point as the zoom center point, where a clockwise motion performs a "zoom in" command and a counterclockwise motion performs a "zoom out" command or vice versa.

By gazing at a zoomable object or object part presented on the information presentation area and in connection to this holding one finger (e.g. one of the thumbs) still while moving another finger (e.g. the other thumb) upwards or downwards, it is possible to zoom in or out of said object using the gaze point as the zoom center point, where an upwards motion performs a "zoom in" command and a downwards motion performs a "zoom out" command or vice versa.

By gazing at a zoomable object or object part presented on the information presentation area while double-tapping on the touch screen with one finger (e.g. one of the thumbs), it is possible to zoom in or out of said object using the gaze point as the zoom center point, where each double-tap toggles between different zoom levels.

By gazing at a zoomable object or object part presented on the information presentation area while sliding two fingers (e.g. the two thumbs) simultaneously in opposite horizontal directions, it is possible to zoom that object or object part.

By gazing at a zoomable object and in connection to this holding a finger (e.g. one thumb) still on the touchscreen while moving another finger (e.g. the other thumb) in a circular motion, it is possible to zoom that object or object part.

By gazing at an object or object part presented on the information presentation area and in connection to this holding a finger (e.g. one of the thumbs) still on the touchscreen while sliding another finger (e.g. the other thumb), it is possible to slide or drag the view presented by the information presentation area.

By gazing at an object or object part presented on the information presentation area and in connection to this holding a finger (e.g. one of the thumbs) still on the touchscreen while sliding another finger (e.g. the other thumb), it is possible to slide or drag the view presented by the information presentation area.

By gazing at an object or object part presented on the information presentation area and while tapping or double-tapping with a finger (e.g. one of the thumbs), an automatic panning function can be activated so that the presentation area is continuously slided from one of the edges of the screen towards the center while the gaze point is near the edge of the information presentation area, until a second user input is received.

By gazing at an object or object part presented on the information presentation area and while tapping or double-tapping with a finger (e.g. one of the thumbs), the presentation area is instantly slided according to the gaze point (e.g. the gaze point is used to indicate the center of where the information presentation area should be slided).

By gazing at a rotatable object or object part presented on the information presentation area while sliding two fingers (e.g. the two thumbs) simultaneously in opposite vertical directions, it is possible to rotate that object or object part.

Before the two-finger gesture is performed, one of the fingers can be used to fine-tune the point of action. For example, a user feedback symbol like a "virtual finger" can be shown on the gaze point when the user touches the touchscreen. The first finger can be used to slide around to adjust the point of action relative to the original point. When the user touches the screen with the second finger, the point of action is fixed and the second finger is used for "clicking" on the point of action or for performing two-finger gestures like the rotate, drag and zoom examples above.

According to another embodiment of the current invention, the gaze tracking module and the user input means are implemented in a portable device such as an iPad, ultrabook tablet or similar device. However, instead of performing the gestures with the thumbs on the presentation area, one or two separate touchpads are placed on the back side of the device to allow two-finger gestures with other fingers than the thumb.

According to another embodiment of the current invention, the gaze tracking module and the user input means are implemented in a vehicle. The information presentation area may be a heads-up display or an infotainment screen. The input means may be one or two separate touch pads on the backside (for use with the index finger/s) or on the front side (for use with the thumb/s) of the steering wheel.

According to another embodiment of the current invention, the gaze tracking module and the information presentation area are implemented in a wearable head mounted display that may be designed to look as a pair of glasses (such as the solution described in U.S. Pat. No. 8,235,529). The user input means may include a gyro and be adapted to be worn on a wrist, hand or at least one finger. For example the input means may be a ring with a wireless connection to the glasses (or to a processing unit such as a smart phone that is communicatively connected to the glasses) and a gyro that detects small movements of the finger where the ring is worn. The detected movements representing gesture data may then wirelessly be communicated to the glasses where gaze is detected and gesture based control commands based on the gesture data from the input means is used to identify and execute user action.

Normally, in most applications, the touchpad is significantly smaller than the information presentation area, which entails that in certain situations the touchpad may impose limitations on the possible user actions. For example, it may be desired to drag or move an object over the entire information presentation area while the user's movement of a finger or fingers is limited by the smaller touchpad area. Therefore, in embodiments of the present invention, a touchscreen like session can be maintained despite that the user has removed the finger or fingers from the touchpad if, for example, a specific or dedicated button or keyboard key is held down or pressed. Thereby, it is possible for the user to perform actions requiring multiple touches on the touchpad. For example, an object can be moved or dragged across the entire information presentation area by means of multiple dragging movements on the touchpad.

In other embodiments of the present invention, a dragging movement on the information presentation area or other user action is continued after the finger or fingers has reached an edge of the touchpad in the same direction as the initial direction of the finger or fingers. The continued movement or other actions may be continued until an interruption command is delivered, which may be, for example, a pressing down of a keyboard key or button, a tap on the touchpad or when the finger or fingers is removed from the touchpad.

In further embodiments of the present invention, the speed of the dragging movement or other action is increased or accelerated when the user's finger or fingers approaches the edge of the touchpad. The speed may be decreased if the fingers or finger is moved in an opposite direction.

In embodiments of the present invention, the action, e.g. a dragging movement of an object, can be accelerated based on gaze position. For example, by gazing at an object, initiating a dragging operation of that object in a desired direction and thereafter gazing at a desired end position for that object, the speed of the object movement will be higher the longer the distance between the initial position of the object and the desired end position is.

In other embodiments of the present invention voice commands may be used to choose what action to perform on the object currently being gazed at and then a gesture is required to fulfill the action. For instance a voice command such as the word "move" may allow the user to move the object currently being gazed at by moving a finger over the touchpad or touchscreen. Another action to perform may be to delete an object. In this case the word "delete" may allow deletion of the object currently being gazed at, but additionally a gesture, such as swiping downwards is required to actually delete the object. Thus, the object to act on is chosen by gazing at it, the specific action to perform is chosen by a voice command and the movement to perform or the confirmation is done by a gesture.

Further objects and advantages of the present invention will be discussed below by means of exemplifying embodiments.

These and other features, aspects and advantages of the invention will be more fully understood when considered with respect to the following detailed description, appended claims and accompanying drawings.

BRIEF DESCRIPTION OF THE DRAWINGS

The drawings are not necessarily drawn to scale and illustrate generally, by way of example, but no way of limitation, various embodiments of the present invention. Thus, exemplifying embodiments of the invention are illustrated by way of example and not by way of limitation in the figures of the accompanying drawings in which like references indicate similar elements. It should be noted that references to "an" or "one" embodiment in this discussion are not necessarily to the same embodiment, and such references mean at least one.

FIG. 12 is a block diagram illustrating the embodiment in accordance with the present invention shown in FIG. 11a;

DETAILED DESCRIPTION OF THE INVENTION

As used herein, the term "module" refers to an application specific integrated circuit (ASIC), an electronic circuit, a processor (shared, dedicated, or group) and memory that execute one or more software programs, a combinational logic circuit, or other suitable components that provide the described functionality. The term "module" further refers to a specific form of software necessary to practice the methods described herein and particularly the functions described in connection with each specific "module". It is believed that the particular form of software will be determined primarily by the particular system architecture employed in the system and by the particular methodologies employed by the system according to the present invention.

The following is a description of exemplifying embodiments in accordance with the present invention. This description is not to be taken in limiting sense, but is made merely for the purposes of describing the general principles of the invention. It is to be understood that other embodiments may be utilized and structural and logical changes may be made without departing from the scope of the present invention.

Figure 1:
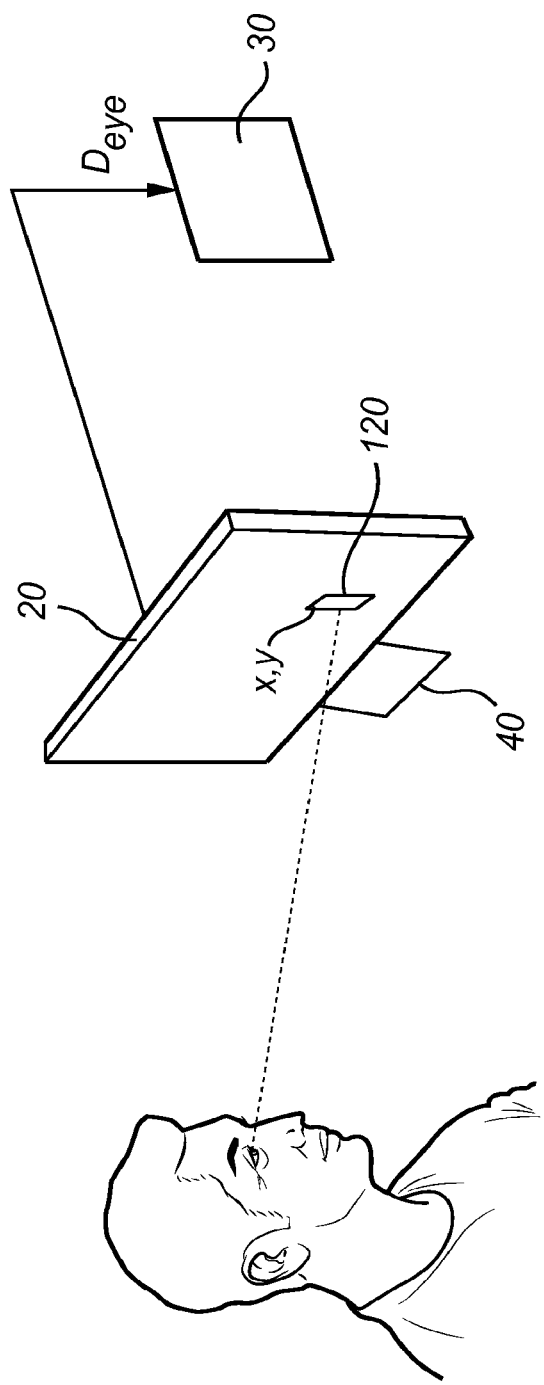
FIG. 1 shows an overview picture of a user controlling a computer apparatus in which the present invention is implemented.

With reference first to FIGS. 1, 2, 3 and 20, embodiments of a computer system according to the present invention will be described. FIG. 1 shows an embodiment of a computer system with integrated gaze and manual control according to the present invention. The user 110 is able to control the computer system 10 at least partly based on an eye-tracking signal D$_{EYE}$, which described the user's point of regard x, y on an information presentation area or display 20 and based on user generated gestures, i.e. a movement of at least one body part of the user can be detected, generating gesture based control commands via user input means 50 such as a touchpad 51.

In the context of the present invention, as mentioned above, the term "touchpad" (or the term "trackpad") refers to a pointing device featuring a tactile sensor, a specialized surface that can translate the motion and position of a user's fingers to a relative position on a screen (information presentation area). Touchpads are a common feature of laptop computers, and are also used as a substitute for a mouse where desk space is scarce. Because they vary in size, they can also be found on personal digital assistants (PDAs) and some portable media players. Wireless touchpads are also available as detached accessories. Touchpads operate in one of several ways, including capacitive sensing and conductance sensing. The most common technology used today entails sensing the capacitive virtual ground effect of a finger, or the capacitance between sensors. While touchpads, like touchscreens, are able to sense absolute position, resolution is limited by their size. For common use as a pointer device, the dragging motion of a finger is translated into a finer, relative motion of the cursor on the screen, analogous to the handling of a mouse that is lifted and put back on a surface. Hardware buttons equivalent to a standard mouse's left and right buttons are positioned below, above, or beside the touchpad. Netbooks sometimes employ the last as a way to save space. Some touchpads and associated device driver software may interpret tapping the pad as a click, and a tap followed by a continuous pointing motion (a "click-and-a-half") can indicate dragging. Tactile touchpads allow for clicking and dragging by incorporating button functionality into the surface of the touchpad itself. To select, one presses down on the touchpad instead of a physical button. To drag, instead performing the "click-and-a-half" technique, one presses down while on the object, drags without releasing pressure and lets go when done. Touchpad drivers can also allow the use of multiple fingers to facilitate the other mouse buttons (commonly two-finger tapping for the center button). Some touchpads have "hotspots", locations on the touchpad used for functionality beyond a mouse. For example, on certain touchpads, moving the finger along an edge of the touch pad will act as a scroll wheel, controlling the scrollbar and scrolling the window that has the focus vertically or horizontally. Apple uses two-finger dragging for scrolling on their trackpads. Also, some touchpad drivers support tap zones, regions where a tap will execute a function, for example, pausing a media player or launching an application. All of these functions are implemented in the touchpad device driver software, and can be disabled. Touchpads are primarily used in self-contained portable laptop computers and do not require a flat surface near the machine. The touchpad is close to the keyboard, and only very short finger movements are required to move the cursor across the display screen; while advantageous, this also makes it possible for a user's thumb to move the mouse cursor accidentally while typing. Touchpad functionality is available for desktop computers in keyboards with built-in touchpads.

Examples of touchpads include one-dimensional touchpads used as the primary control interface for menu navigation on second-generation and later iPod Classic portable music players, where they are referred to as "click wheels", since they only sense motion along one axis, which is wrapped around like a wheel. In another implementation of touch pads, the second-generation Microsoft Zune product line (the Zune 80/120 and Zune 4/8) uses touch for the Zune Pad. Apple's PowerBook 500 series was its first laptop to carry such a device, which Apple refers to as a "trackpad". Apple's more recent laptops feature trackpads that can sense up to five fingers simultaneously, providing more options for input, such as the ability to bring up the context menu by tapping two fingers. In late 2008 Apple's revisions of the MacBook and MacBook Pro incorporated a "Tactile Touchpad" design with button functionality incorporated into the tracking surface.

The present invention provides a solution enabling a user of a computer system without a traditional touchscreen to interact with graphical user interfaces in a touchscreen like manner using a combination of gaze based input and gesture based user commands. Furthermore, the present invention offers a solution for touchscreen like interaction using gaze input and gesture based input as a complement or an alternative to touchscreen interactions with a computer device having a touchscreen.

The display 20 may hence be any type of known computer screen or monitor, as well as combinations of two or more separate displays. For example, the display 20 may constitute a regular computer screen, a stereoscopic screen, a heads-up display (HUD) in a vehicle, or at least one head-mounted display (HMO).

The computer 30 may, for example, be any one from the group of a personal computer, computer workstation, mainframe computer, a processor in a vehicle, or a handheld device such as a cell phone, portable music player (such as e.g. an iPod), laptop computers, computer games, electronic books and similar other devices. The present invention may also be implemented in "intelligent environment" where, for example, objects presented on multiple displays can be selected and activated.

In order to produce the gaze tracking signal DEYE, a gaze tracker unit 40 is included in the display 20, or is associated with the display 20. A suitable gaze tracker is described in the U.S. Pat. No. 7,572,008, titled "Method and Installation for detecting and following an eye and the gaze direction thereof", by the same applicant, which hereby is incorporated in its entirety.

The software program or software implemented instructions associated with the gaze tracking module 40 may be included within the gaze tracking module 40. The specific example shown in FIGS. 2, 3 and 20 illustrates the associated software implemented in a gaze tracking module, which may be included solely in the computer 30, in the gaze tracking module 40, or in a combination of the two, depending on the particular application.

Figure 2:
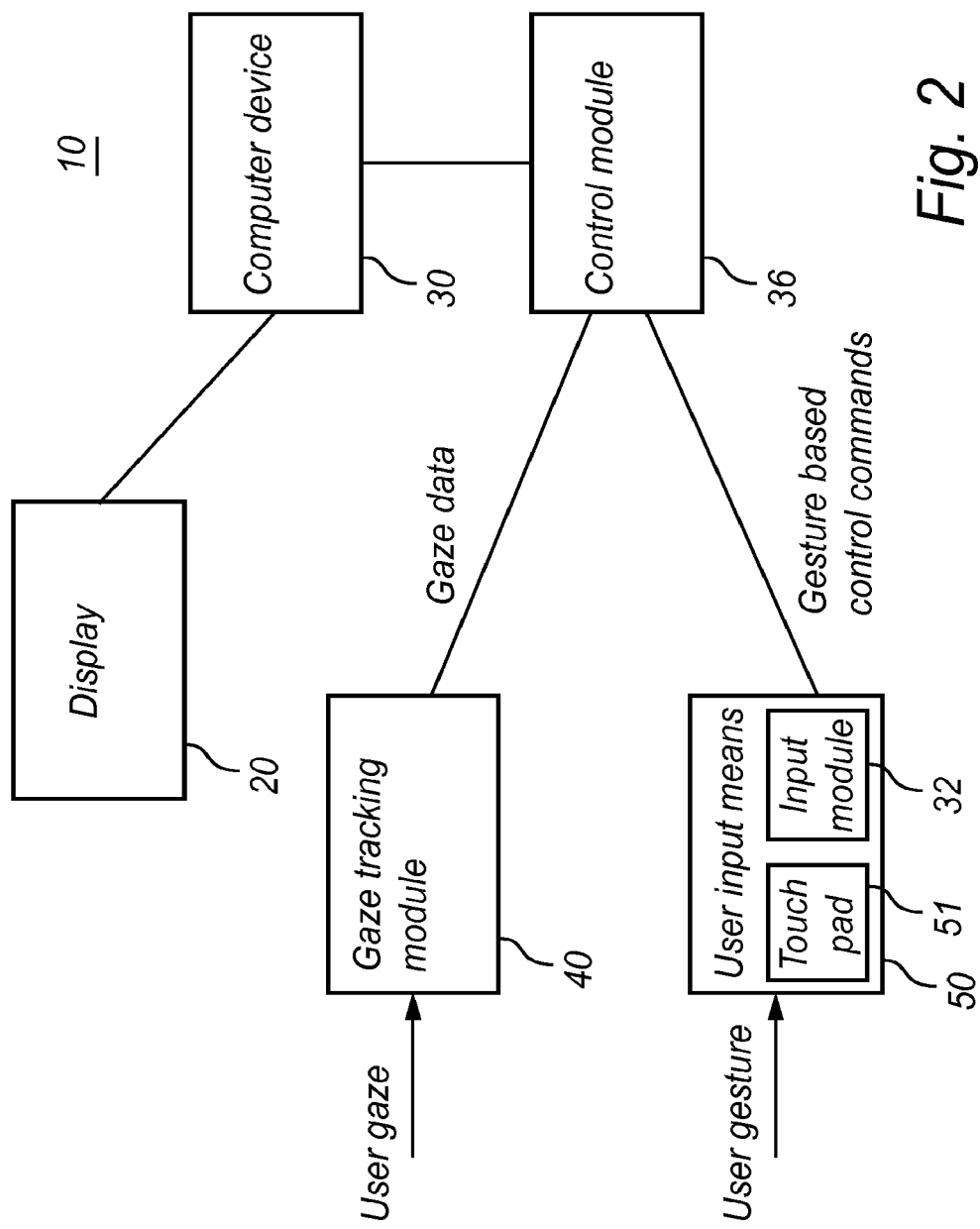
FIG. 2 is a block diagram illustrating an embodiment of an arrangement in accordance with the present invention.
Figure 3:
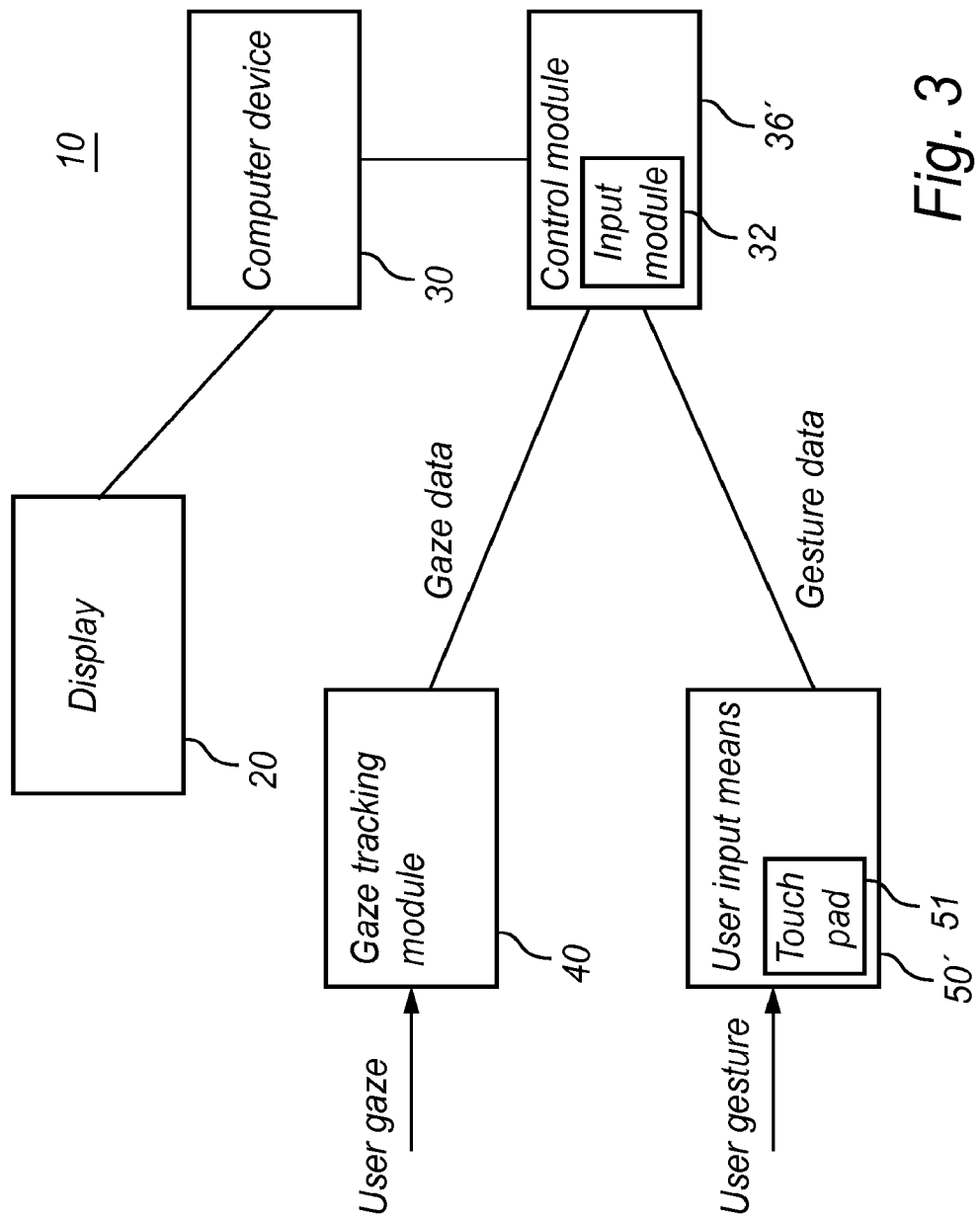
FIG. 3 is a block diagram illustrating another embodiment of an arrangement in accordance with the present invention.
Figure 20:
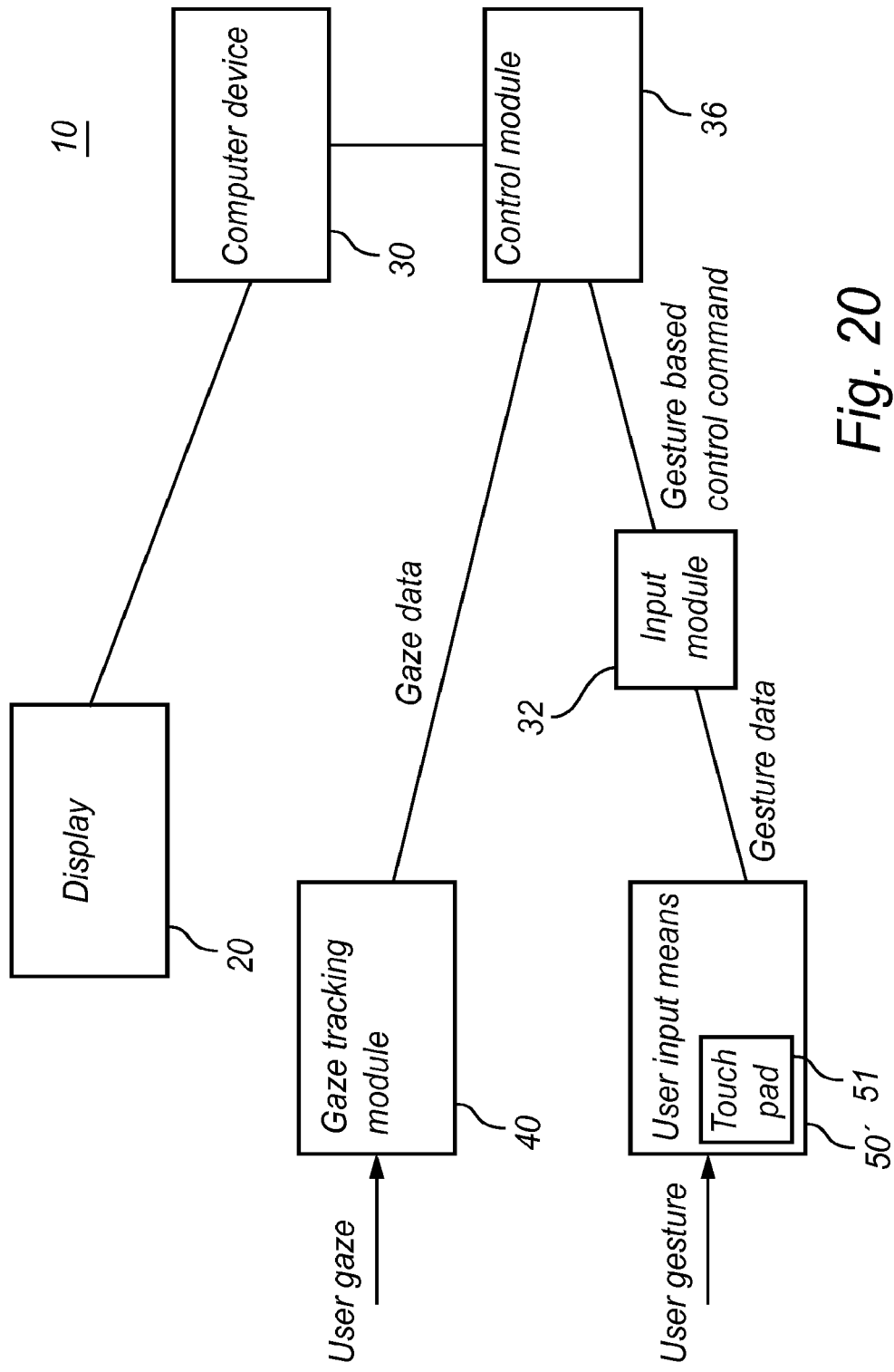
FIG. 20 is a block diagram illustrating a further embodiment of an arrangement in accordance with the present invention.

The computer system 10 comprises a computer device 30, a gaze tracking module 40, a display 20, a control module 36, 36' and user input means 50, 50' as shown in FIGS. 2, 3 and 20. The computer device 30 comprises several other components in addition to those illustrated in FIGS. 2 and 20 but these components are omitted from FIGS. 2, 3 and 20 in illustrative purposes.

The user input means 50, 50' comprises elements that are sensitive to pressure, physical contact, gestures, or other manual control by the user, for example, a touchpad 51. Further, the input device means 50, 50' may also include a computer keyboard, a mouse, a "track ball", or any other device, for example, an IR-sensor, voice activated input means, or a detection device of body gestures or proximity based input can be used. However, in the specific embodiments shown in FIGS. 2, 3 and 20, a touchpad 51 is included in the user input device 50, 50'.

An input module 32, which may be a software module included solely in a control module 36' or in the user input means 50 or as a module separate from the control module and the input means 50', is configured to receive signals from the touchpad 51 reflecting a user's gestures. Further, the input module 32 is also adapted to interpret the received signals and provide, based on the interpreted signals, gesture based control commands, for example, a tap command to activate an object, a swipe command or a slide command.

If the input module 32 is included in the input means 50, gesture based control commands are provided to the control module 36, see FIG. 2. In embodiments of the present invention, the control module 36' includes the input module 32 based on gesture data from the user input means 50', see FIG. 3.

The control module 36, 36' is further configured to acquire gaze data signals from the gaze tracking module 40. Further, the control module 36, 36' is configured to determine a gaze point area 120 on the information presentation area 20 where the user's gaze point is located based on the gaze data signals. The gaze point area 120 is preferably, as illustrated in FIG. 1, a local area around a gaze point of the user.

Moreover, the control module 36, 36' is configured to execute at least one user action manipulating a view presented on the graphical information presentation area 20 based on the determined gaze point area and the at least one user generated gesture based control command, wherein the user action is executed with the determined gaze point area as a starting point. The control module 36, 36' may be integrated in the computer device 30 or may be associated or coupled to the computer device 30.

Hence, the present invention allows a user to interact with a computer device 30 in touchscreen like manner, e.g. manipulate objects presented on the information presentation area 20, using gaze and gestures, e.g. by moving at least one finger on a touchpad 51.

Preferably, when the user touches the touchpad 51, the location of the initial gaze point is indicated by a visual feedback, such as a crosshairs or similar sign. This initial location can be adjusted by moving the finger on the touchpad 51. Thereafter, the user can, in a touchscreen like manner, interact with the information presentation area 20 using different gestures and the gaze. In the embodiment including a touchpad, the gestures are finger movements relative the touchpad 51 and each gesture is associated with or corresponds to particular gesture based user command resulting in a user action.

Figure 4:
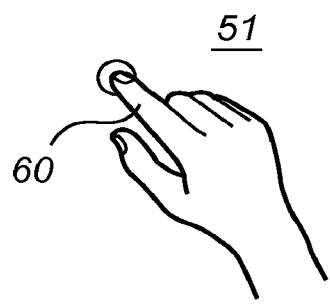
FIG. 4 illustrates an exemplary gesture resulting in a user generated gesture based control command in accordance with the present invention.

Below, a non-exhaustive number of examples of user actions that can be executed using a combination of gestures and gaze will be discussed with regard to FIGS. 4-10:

By gazing, for example, at an object presented on the information presentation area 20 and by in connection to this, touching the touchpad or pressing down and holding a finger 60 (see FIG. 4) on the touchpad 51 during a period of y ms, that object is highlighted. If the finger 60 is held down during a second period of z ms, an information box may be displayed presenting information regarding that object. In FIG. 4, this gesture is illustrated in relation to a touchpad 51.

Figure 5:
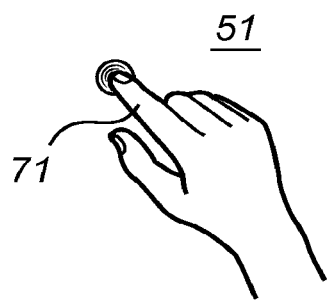
FIG. 5 illustrates another exemplary gesture resulting in a user generated gesture based control command in accordance with the present invention.

By gazing, for example, at an object presented on the information presentation area 20 and by in connection to this tapping on the touchpad 51 using a finger 71, a primary action can be initiated. For example, an application can be opened and started by gazing at an icon representing the application and tapping on the touchpad 51 using a finger. In FIG. 5, this gesture is illustrated in relation to a touchpad 51.

Figure 6:
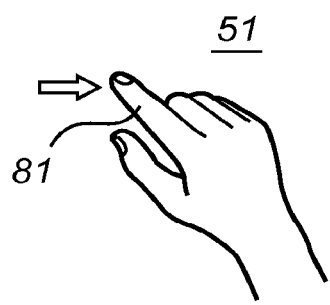
FIG. 6 illustrates a further exemplary gesture resulting in a user generated gesture based control command in accordance with the present invention.

The user may slide or drag the view presented by the information presentation area 20 by gazing somewhere on the information presentation area 20 and by, in connection to this, sliding his or her finger 81 over the touchpad 51. A similar action to slide an object over the information presentation area 20 can be achieved by gazing at the object and by, in connection to this, sliding the finger 81 over the touchpad 51. This gesture is illustrated in FIG. 6 in relation to the touchpad 51. Of course, this gesture can be executed by means of more than one finger, for example, by using two fingers.

Figure 7:
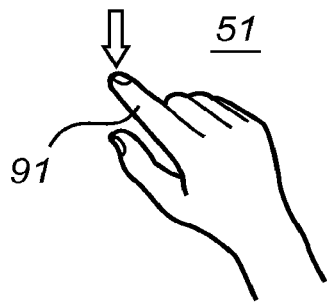
FIG. 7 illustrates yet another exemplary gesture resulting in a user generated gesture based control command in accordance with the present invention.

The user may select an object for further actions by gazing at the object and by, in connection to this, swiping his or her finger 91 on the touchpad 51 in a specific direction. This gesture is illustrated in FIG. 7 in relation to the touchpad 51. Of course, this gesture can be executed by means of more than one finger, for example, by using two fingers.

Figure 8:
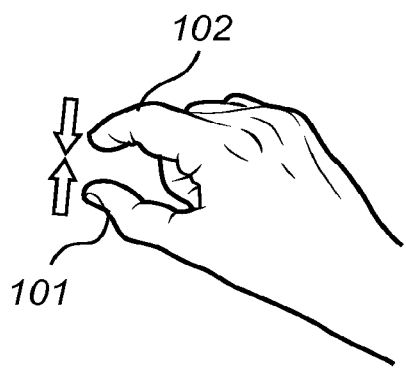
FIG. 8 illustrates a further exemplary gesture resulting in a user generated gesture based control command in accordance with the present invention.

By gazing at an object or object part presented on the information presentation area 20 and by, in connection to this, pinching with two of his or hers finger 101 and 102, it is possible to zoom out that object or object part. This gesture is illustrated in FIG. 8 in relation to the touchpad 51. Similarly, by gazing at an object or object part presented on the information presentation area 20 and by, in connection to this, moving the fingers 101 and 102 apart, it is possible to expand or zoom in that object or object part.

Figure 9:
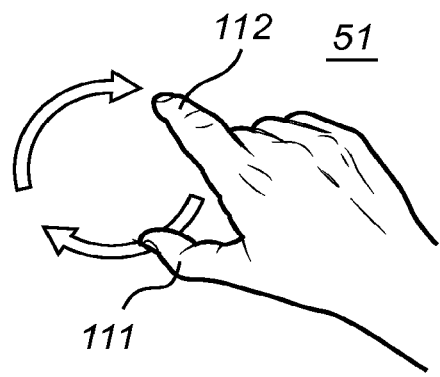
FIG. 9 illustrates another exemplary gesture resulting in a user generated gesture based control command in accordance with the present invention.
Figure 10:
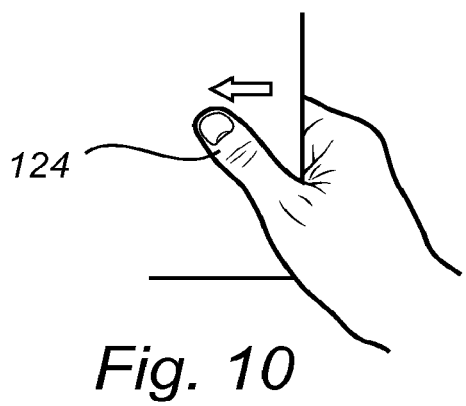
FIG. 10 illustrates yet another exemplary gesture resulting in a user generated gesture based control command in accordance with the present invention.

By gazing at an object or object part presented on the information presentation area 20 and by, in connection to this, rotating with two of his or hers finger 111 and 112, it is possible to rotate that object or object part. This gesture is illustrated in FIG. 9 in relation to the touchpad 51.

By gazing at an edge or frame part of the information presentation area 20 or at an area in proximity to the edge or frame and, in connection to this, sliding his or her finger or fingers 124 on the touchpad 51 in a direction which if performed at the point of gaze would have been from the edge towards a center of the information presentation area a menu may come in from the edge.

By gazing at a slider control, for example a volume control, the finger can be moved up/down (or left/right for a horizontal control) to adjust the value of the slider control. With appropriate input means this gesture can be detected on a touchpad, on a touch screen or in air without physically touching the input means.

By gazing at a checkbox control while doing a "check-gesture" (such as a "V") on the touchpad, the checkbox can be checked or unchecked. With appropriate input means this gesture can be detected on a touchpad, on a touch screen or in air without physically touching the input means.

By gazing at an object or object part where several options are available, for example "copy" or "rename", the different options can be displayed on different sides of the object after a preset focusing dwell time has passed or after appropriate user input has been provided. Thereafter a gesture is done to choose action. For example, swipe left to copy and swipe right to rename. With appropriate input means this gesture can be detected on a touchpad, on a touch screen or in air without physically touching the input means.

By pressing the finger harder on the touchpad, i.e. increasing the pressure of a finger touching the touchpad, a sliding mode can be initiated. For example, by gazing at an object, touching the touchpad, increasing the pressure on the touchpad and moving the finger or finger over the touchscreen, the object can be moved or dragged over the information presentation area. When the user removes the finger from the touch pad 51, the touchscreen like session is finished. The user may thereafter start a new touchscreen like session by gazing at the information presentation area 20 and placing the finger on the touchpad 51.

As mentioned, the gesture and gaze initiated actions discussed above are only exemplary and there are a large number of further gestures in combination with gaze point resulting in an action that are conceivable. With appropriate input means many of these gestures can be detected on a touchpad, on a predefined area of a touch screen, in air without physically touching the input means, or by an input means worn on a finger or a hand of the user. Below, some further examples are described:

Selection of an object or object part can be made by gazing at that object or object part and pressing a finger (e.g. a thumb), fine tuning by moving the finger and releasing the pressure applied by the finger to select that object or object part;

Selection of an object or object part can be made by gazing at that object or object part, pressing a finger (e.g. a thumb), fine tuning by moving the finger, using another finger (e.g. the other thumb) to tap for selecting that object or object part. In addition, a double tap may be used for a "double click action" and a quick downward movement may be used for a "right click".

By gazing at a zoomable object or object part presented on the information presentation area while moving a finger (e.g. one of the thumbs) in a circular motion, it is possible to zoom in or out of the said object using the gaze point as the zoom center point, where a clockwise motion performs a "zoom in" command and a counterclockwise motion performs a "zoom out" command or vice versa.

By gazing at a zoomable object or object part presented on the information presentation area and in connection to this holding one finger (e.g. one of the thumbs) still while moving another finger (e.g. the other thumb) upwards and downwards, it is possible to zoom in or out of the said object using the gaze point as the zoom center point, where an upwards motion performs a "zoom in" command and a downwards motion performs a "zoom out" command or vice versa.

By gazing at a zoomable object or object part presented on the information presentation area and while pressing hard on a pressure-sensitive touchpad with one finger (e.g. one of the thumbs), it is possible to zoom in or out on the said object using the gaze point as the zoom center point, where each hard press toggles between different zoom levels.

By gazing at a zoomable object or object part presented on the information presentation area while double-tapping on a touchpad with one finger (e.g. one of the thumbs), it is possible to zoom in or out of the said object using the gaze point as the zoom center point, where each double-tap toggles between different zoom levels.

By gazing at a zoomable object or object part presented on the information presentation area while sliding two fingers (e.g. the two thumbs) simultaneously in opposite horizontal directions, it is possible to zoom that object or object part.

By gazing at a zoomable object and in connection to this holding finger (e.g. one thumb) still on the touchscreen while moving another finger (e.g. the other thumb) in a circular motion, it is possible to zoom that object or object part.

By gazing at an object or object part presented on the information presentation area and in connection to this holding a finger (e.g. one of the thumbs) still on the touchscreen while sliding another finger (e.g. the other thumb), it is possible to slide or drag the view presented by the information presentation area.

By gazing at an object or object part presented on the information presentation area and in connection to this holding a finger (e.g. one of the thumbs) still on the touchscreen while sliding another finger (e.g. the other thumb), it is possible to slide or drag the view presented by the information presentation area.

By gazing at an object or object part presented on the information presentation area and while tapping or double-tapping with a finger (e.g. one of the thumbs), an automatic panning function can be activated so that the presentation area is continuously slided from one of the edges of the screen towards the center while the gaze point is near the edge of the information presentation area, until a second user input is received.

By gazing at an object or object part presented on the information presentation area and while tapping or double-tapping with a finger (e.g. one of the thumbs), the presentation area is instantly slided according to the gaze point (e.g. the gaze point is used to indicate the center of where the information presentation area should be slided).

By gazing at a rotatable object or object part presented on the information presentation area while sliding two fingers (e.g. the two thumbs) simultaneously in opposite vertical directions, it is possible to rotate that object or object part.

Before the two-finger gesture is performed, one of the fingers can be used to fine-tune the point of action. For example, a user feedback symbol like a "virtual finger" can be shown on the gaze point when the user touches the touchscreen. The first finger can be used to slide around to adjust the point of action relative to the original point. When user touches the screen with the second finger, the point of action is fixed and the second finger is used for "clicking" on the point of action or for performing two-finger gestures like the rotate, drag and zoom examples above.

In embodiments of the present invention, the touchscreen like session can be maintained despite that the user has removed the finger or fingers from the touchpad if, for example, a specific or dedicated button or keyboard key is held down or pressed. Thereby, it is possible for the user to perform actions requiring multiple touches on the touchpad. For example, an object can be moved or dragged across the entire information presentation area by means of multiple dragging movements on the touchpad.

Figure 11A:
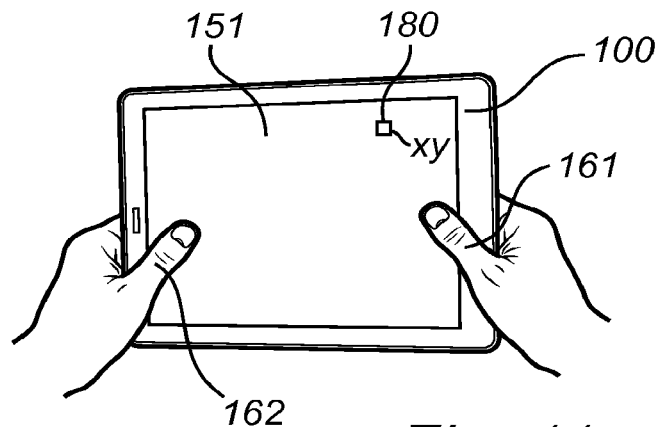
FIG. 11a shows an overview picture of a touchscreen provided device in which a further embodiment of the present invention is implemented.
Figure 11B:
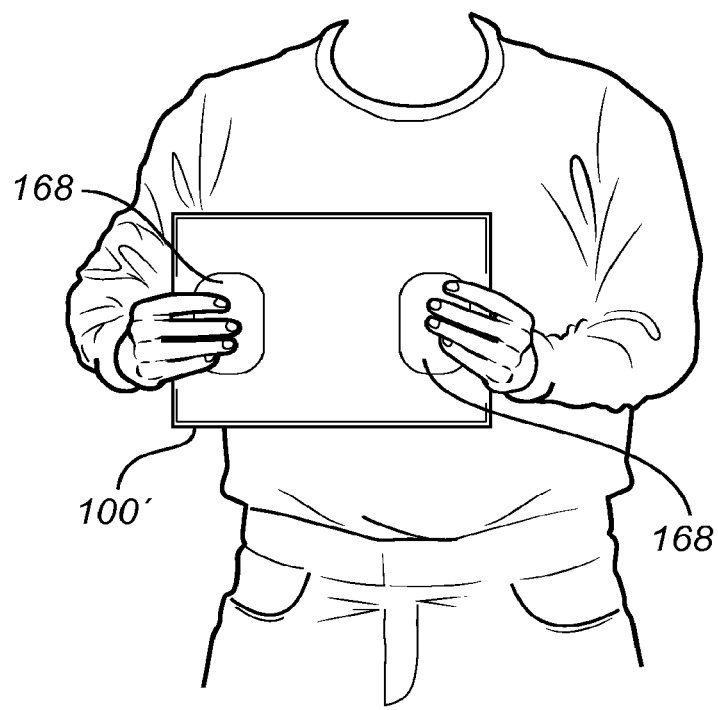
FIG. 11b shows an overview picture of a device provided with touchpads on a backside in which a further embodiment of the present invention is implemented.
Figure 12:
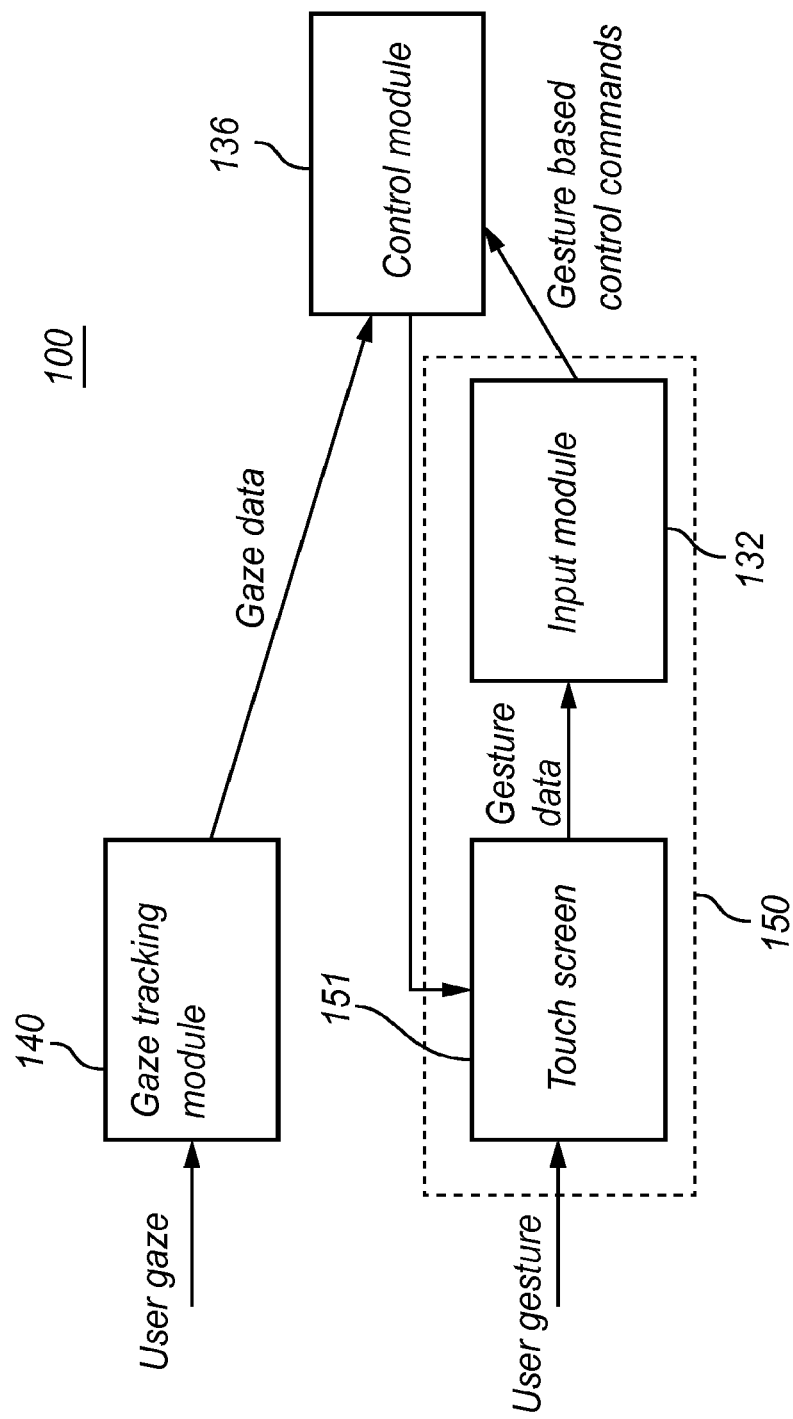

With reference now to FIGS. 11a, 11b and 12, further embodiments of the present invention will be discussed. FIG. 11a shows a further embodiment of a system with integrated gaze and manual control according to the present invention. This embodiment of the system is implemented in a device 100 with a touchscreen 151 such as an iPad or similar device. The user is able to control the device 100 at least partly based on gaze tracking signals which describes the user's point of regard x, y on the touchscreen 151 and based on user generated gestures, i.e. a movement of at least one body part of the user can be detected, generating gesture based control commands via user input means 150 including the touchscreen 151.

The present invention provides a solution enabling a user of a device 100 with a touchscreen 151 to interact with a graphical user interfaces using gaze as direct input and gesture based user commands as relative input. Thereby, it is possible, for example, to hold the device 100 with both hands and interact with a graphical user interface 180 presented on the touchscreen with gaze and the thumbs 161 and 162 as shown in FIG. 11a.

In an alternative embodiment, one or more touchpads 168 can be arranged on the backside of the device 100', i.e. on the side of the device on which the user normally do not look at during use. This embodiment is illustrated in FIG. 11b. Thereby, a user is allowed to control the device at least partly based on gaze tracking signals which describes the user's point of regard x, y on the information presentation area and based on user generated gestures, i.e. a movement of at least one finger on the one or more touchpads 168 on the backside of the device 100', generating gesture based control commands interpreted by the control module. In order to produce the gaze tracking signal, a gaze tracking module 140 is included in the device 100, 100'. A suitable gaze tracker is described in the U.S. Pat. No. 7,572,008, titled "Method and Installation for detecting and following an eye and the gaze direction thereof", by the same applicant, which hereby is incorporated in its entirety.

The software program or software implemented instructions associated with the gaze tracking module 140 may be included within the gaze tracking module 140.

The device 100 comprises a gaze tracking module 140, user input means 150 including the touchscreen 151 and an input module 132, and a control module 136 as shown in FIG. 12. The device 100 comprises several other components in addition to those illustrated in FIG. 12 but these components are omitted from FIG. 12 in illustrative purposes.

The input module 132, which may be a software module included solely in a control module or in the user input means 150, is configured to receive signals from the touchscreen 151 reflecting a user's gestures. Further, the input module 132 is also adapted to interpret the received signals and provide, based on the interpreted signals, gesture based control commands, for example, a tap command to activate an object, a swipe command or a slide command.

The control module 136 is configured to acquire gaze data signals from the gaze tracking module 140 and gesture based control commands from the input module 132. Further, the control module 136 is configured to determine a gaze point area 180 on the information presentation area, i.e. the touchscreen 151, where the user's gaze point is located based on the gaze data signals. The gaze point area 180 is preferably, as illustrated in FIG. 1, a local area around a gaze point of the user.

Moreover, the control module 136 is configured to execute at least one user action manipulating a view presented on the touchscreen 151 based on the determined gaze point area and the at least one user generated gesture based control command, wherein the user action is executed with the determined gaze point area as a starting point. All user actions described in the context of this application may also be executed with this embodiment of the present invention.

In a possible further embodiment, when the user touches the touchscreen 151, the location of the initial gaze point is indicated by a visual feedback, such as a crosshairs or similar sign. This initial location can be adjusted by moving the finger on the touchscreen 151, for example, using a thumb 161 or 162. Thereafter, the user can interact with the touchscreen 151 using different gestures and the gaze, where the gaze is the direct indicator of the user's interest and the gestures are relative to the touchscreen 151. In the embodiment including a touchscreen, the gestures are finger movements relative the touchscreen 151 and each gesture is associated with or corresponds to particular gesture based user command resulting in a user action.

Figure 13A:
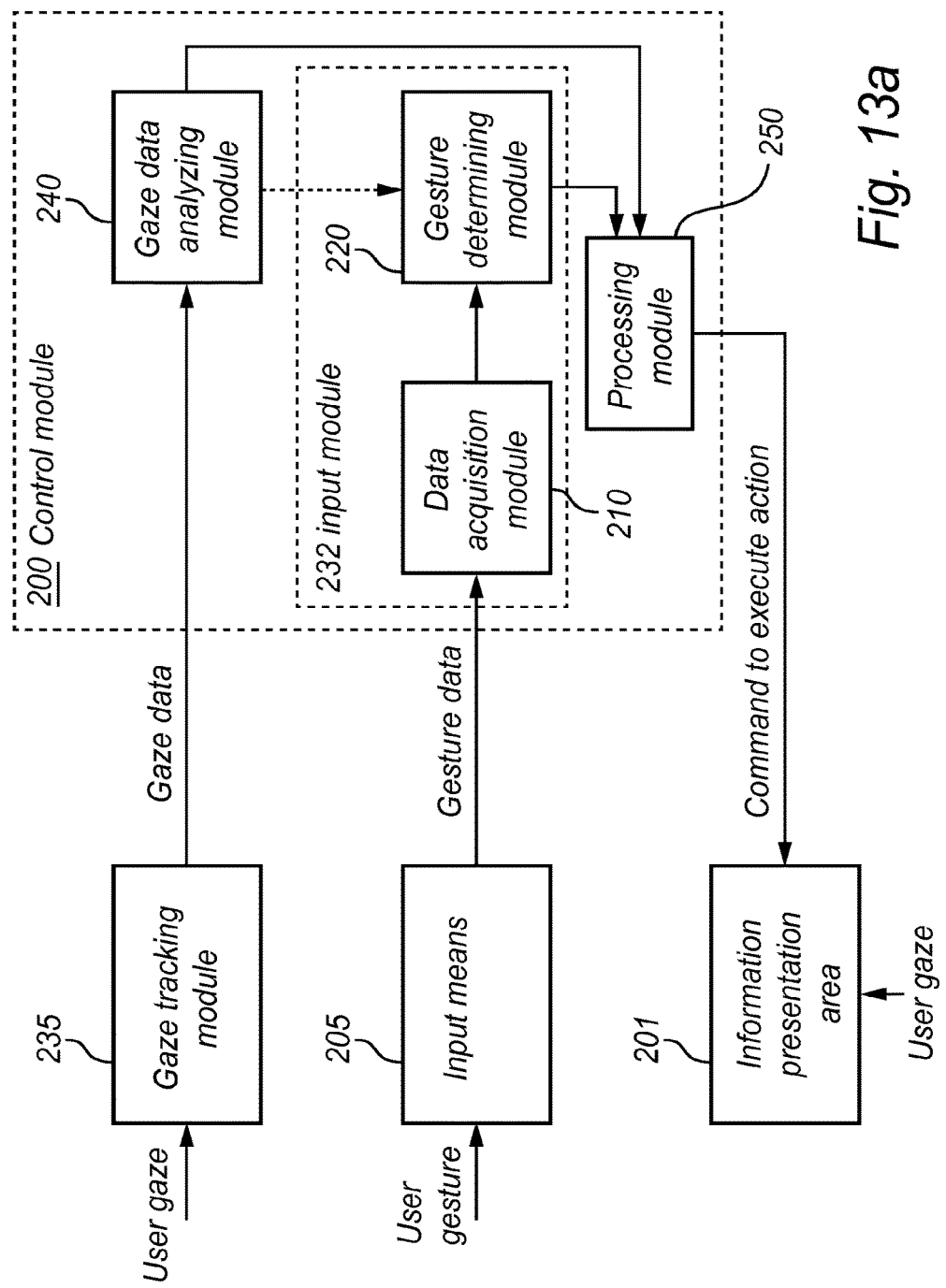
FIG. 13a is a schematic view of a control module according to an embodiment of the present invention.
Figure 13B:
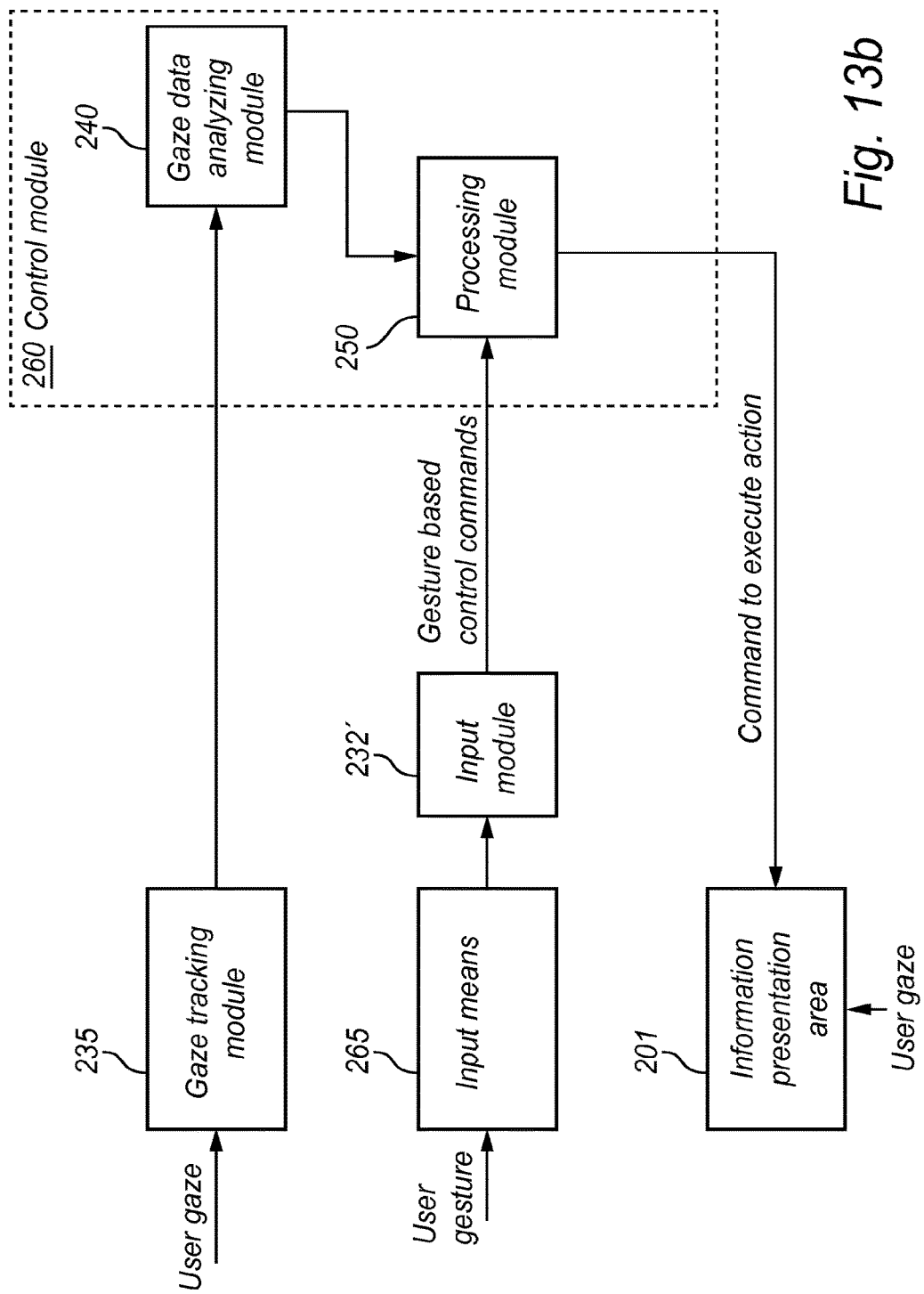
FIG. 13b is a schematic view of a control module according to another embodiment of the present invention.
Figure 13C:
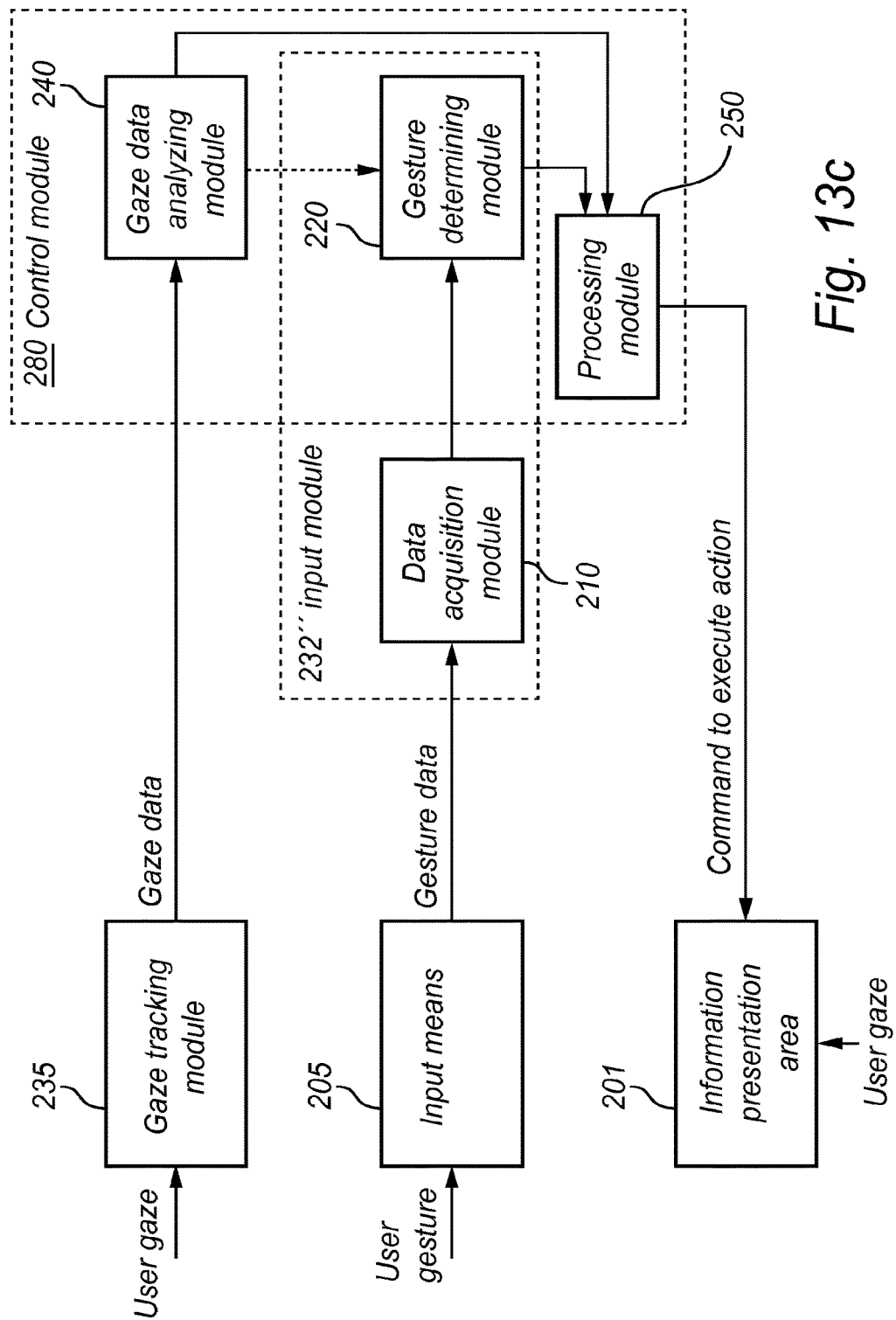
FIG. 13c is a schematic view of a control module according to another embodiment of the present invention.

With reference now to FIGS. 13a, 13b and 13c, control modules for generating gesture based commands during user interaction with an information presentation area 201, for example, associated with a WTRU (described below with reference to FIG. 14), or a computer device or handheld portable device (described below with reference to FIG. 15a or 15b), or in a vehicle (described below with reference to FIG. 21), or in a wearable head mounted display (described below with reference to FIG. 22) will be described. Parts or modules described above will not be described in detail again in connection to this embodiment.

According to an embodiment of the present invention shown in FIG. 13a, the control module 200 is configured to acquire user input from input means 205, for example, included in a device in which the control module may be arranged in, adapted to detect user generated gestures. For this purpose, the control module 200 may include an input module 232 comprising a data acquisition module 210 configured to translate the gesture data from the input means 205 into an input signal. The input means 205 may include elements that are sensitive to pressure, physical contact, gestures, or other manual control by the user, for example, a touchpad. Further, the input means 205 may also include a computer keyboard, a mouse, a "track ball", or any other device, for example, an IR-sensor, voice activated input means, or a detection device of body gestures or proximity based input can be used.

Further, the input module 232 is configured to determine at least one user generated gesture based control command based on the input signal. For this purpose, the input module 232 further comprises a gesture determining module 220 communicating with the data acquisition module 210. The gesture determining module 220 may also communicate with the gaze data analyzing module 240. The gesture determining module 220 may be configured to check whether the input signal corresponds to a predefined or predetermined relative gesture and optionally use gaze input signals to interpret the input signal. For example, the control module 200 may comprise a gesture storage unit (not shown) storing a library or list of predefined gestures, each predefined gesture corresponding to a specific input signal. Thus, the gesture determining module 220 is adapted to interpret the received signals and provide, based on the interpreted signals, gesture based control commands, for example, a tap command to activate an object, a swipe command or a slide command.

A gaze data analyzing module 240 is configured to determine a gaze point area on the information presentation area 201 including the user's gaze point based on at least the gaze data signals from the gaze tracking module 235. The information presentation area 201 may be a display of any type of known computer screen or monitor, as well as combinations of two or more separate displays, which will depend on the specific device or system in which the control module is implemented in. For example, the display 201 may constitute a regular computer screen, a stereoscopic screen, a heads-up display (HUD) in a vehicle, or at least one head-mounted display (HMO). Then, a processing module 250 may be configured to execute at least one user action manipulating a view presented on the information presentation area 201 based on the determined gaze point area and at least one user generated gesture based control command, wherein the user action is executed with the determined gaze point area as a starting point. Hence, the user is able to control a device or system at least partly based on an eye-tracking signal which described the user's point of regard x, y on the information presentation area or display 201 and based on user generate gestures, i.e. a movement of at least one body part of the user can be detected, generating gesture based control commands via user input means 205 such as a touchpad.

According to another embodiment a control module according to the present invention shown in FIG. 13b, the control module 260 is configured to acquire gesture based control commands from an input module 232'. The input module 232' may comprise a gesture determining module and a data acquisition module as described above with reference to FIG. 13a. A gaze data analyzing module 240 is configured to determine a gaze point area on the information presentation area 201 including the user's gaze point based on at least the gaze data signals received from the gaze tracking module 235. The information presentation area 201 may be a display of any type of known computer screen or monitor, as well as combinations of two or more separate displays, which will depend on the specific device or system in which the control module is implemented in. For example, the display 201 may constitute a regular computer screen, a stereoscopic screen, a heads-up display (HUD) in a vehicle, or at least one head-mounted display (HMO). A processing module 250 may be configured to execute at least one user action manipulating a view presented on the information presentation area 201 based on the determined gaze point area and at least one user generated gesture based control command, wherein the user action is executed with the determined gaze point area as a starting point. Hence, the user is able to control a device or system at least partly based on an eye-tracking signal which described the user's point of regard x, y on the information presentation area or display 201 and based on user generated gestures, i.e. a movement of at least one body part of the user can be detected, generating gesture based control commands via user input means 205 such as a touchpad.

With reference to FIG. 13c, a further embodiment of a control module according to the present invention will be discussed. The input module 232" is distributed such that the data acquisition module 210 is provided outside the control module 280 and the gesture determining module 220 is provided in the control module 280. A gaze data analyzing module 240 is configured to determine a gaze point area on the information presentation area 201 including the user's gaze point based on at least the gaze data signals received from the gaze tracking module 235. The information presentation area 201 may be a display of any type of known computer screen or monitor, as well as combinations of two or more separate displays, which will depend on the specific device or system in which the control module is implemented in. For example, the display 201 may constitute a regular computer screen, a stereoscopic screen, a heads-up display (HUD) in a vehicle, or at least one head-mounted display (HMO). A processing module 250 may be configured to execute at least one user action manipulating a view presented on the information presentation area 201 based on the determined gaze point area and at least one user generated gesture based control command, wherein the user action is executed with the determined gaze point area as a starting point. Hence, the user is able to control a device or system at least partly based on an eye-tracking signal which described the user's point of regard x, y on the information presentation area or display 201 and based on user generated gestures, i.e. a movement of at least one body part of the user can be detected, generating gesture based control commands via user input means 205 such as a touchpad.

Figure 14:
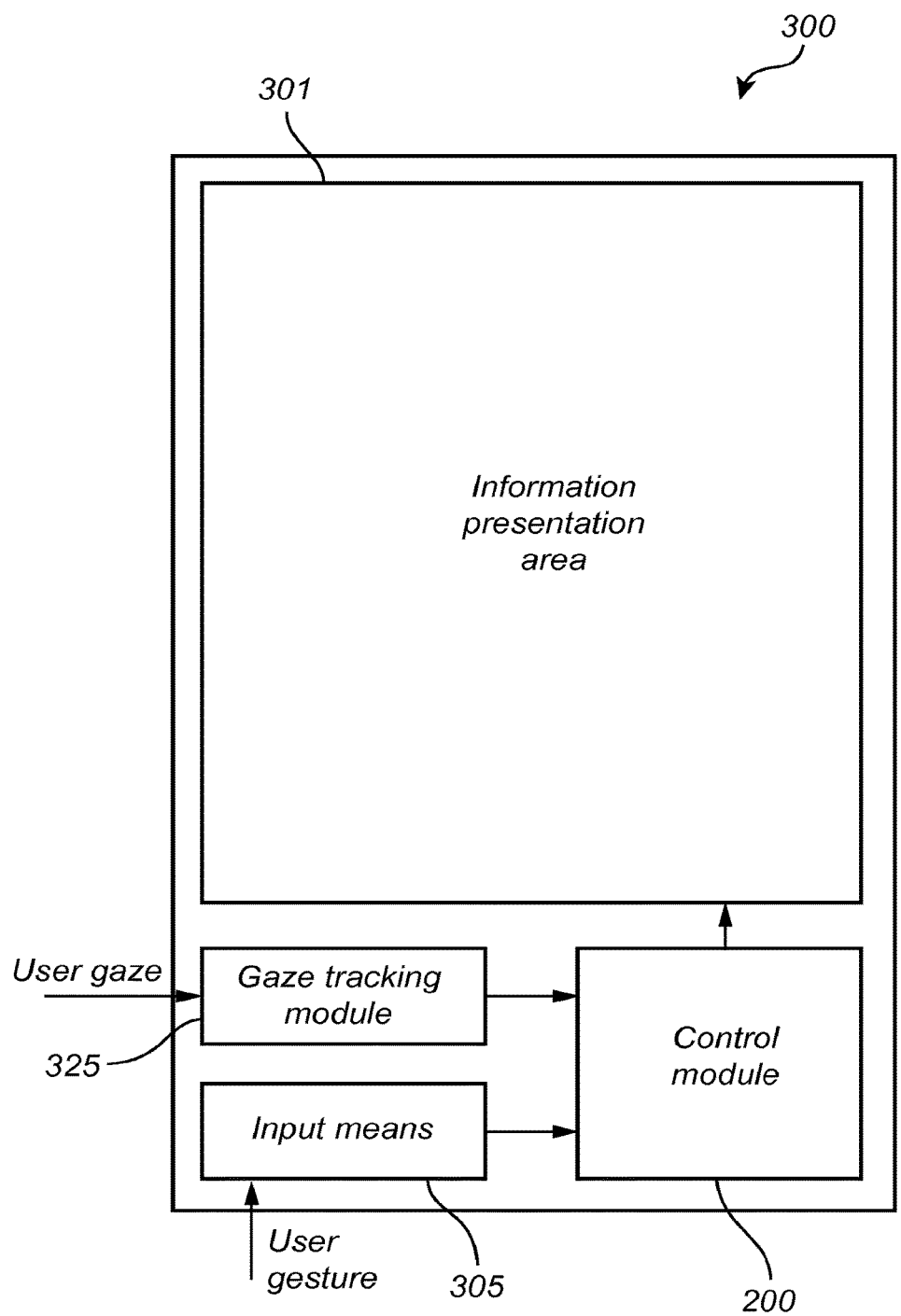
FIG. 14 is a schematic view of a wireless transmit/receive unit, WTRU, according to an embodiment of the present invention.

With reference to FIG. 14, a wireless transmit/receive unit (WTRU) such as a cellular telephone or a smartphone, in accordance with the present invention will be described. Parts or modules described above will not be described in detail again. Further, only parts or modules related to the present invention will be described below. Accordingly, the WTRU includes a large number of additional parts, units and modules that are not described herein such as antennas and transmit/receive units. The wireless transmit/receive unit (WTRU) 300 is associated with an information presentation area 301 and further comprises input means 305, including e.g. an input module as has been described above, adapted to detect user generated gestures and a gaze tracking module 325 adapted to detect gaze data of a viewer of the information presentation area 301. The WTRU further comprises a control module 200, 260 or 280 as described above with reference to FIGS. 13a, 13b and 13c. The user is able to control the WTRU at least partly based on an eye-tracking signal which describes the user's point of regard x, y on the information presentation area or display 301 and based on user generated gestures, i.e. a movement of at least one body part of the user can be detected, generating gesture based control commands via user input means 305 such as a touchpad. All user actions described in the context of this application may also be executed with this embodiment of the present invention.

Figure 15A:
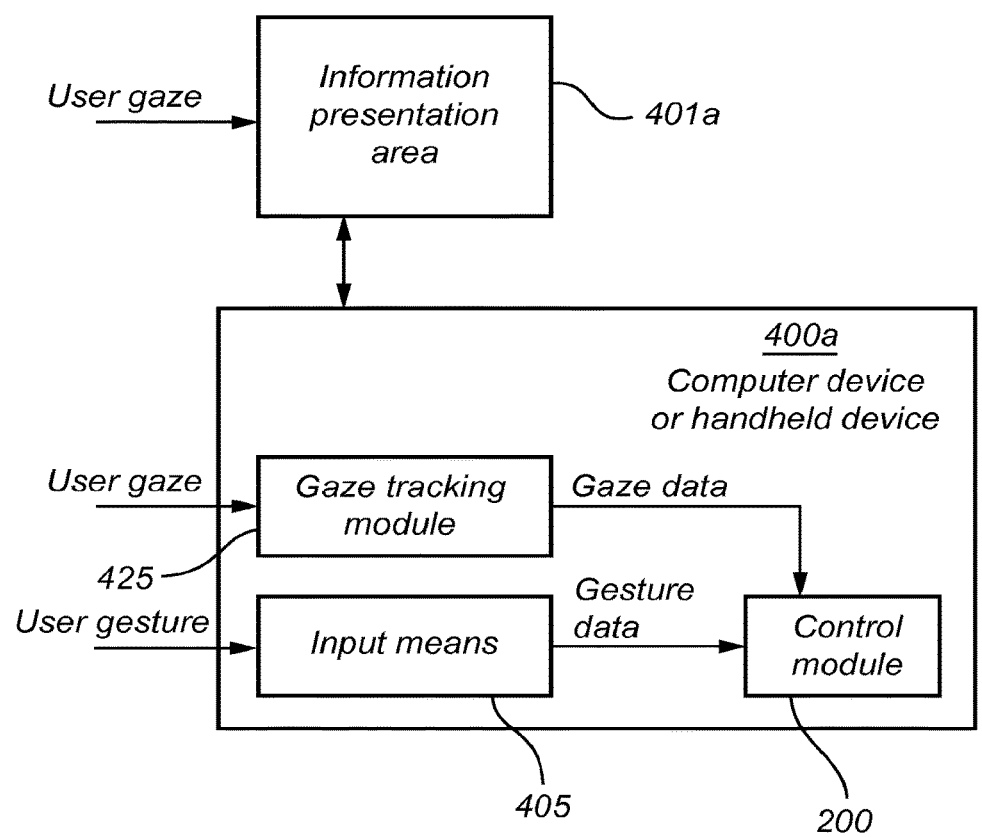
FIG. 15a is a schematic view of an embodiment of a computer device or handheld device in accordance with an embodiment of the present invention.
Figure 15B:
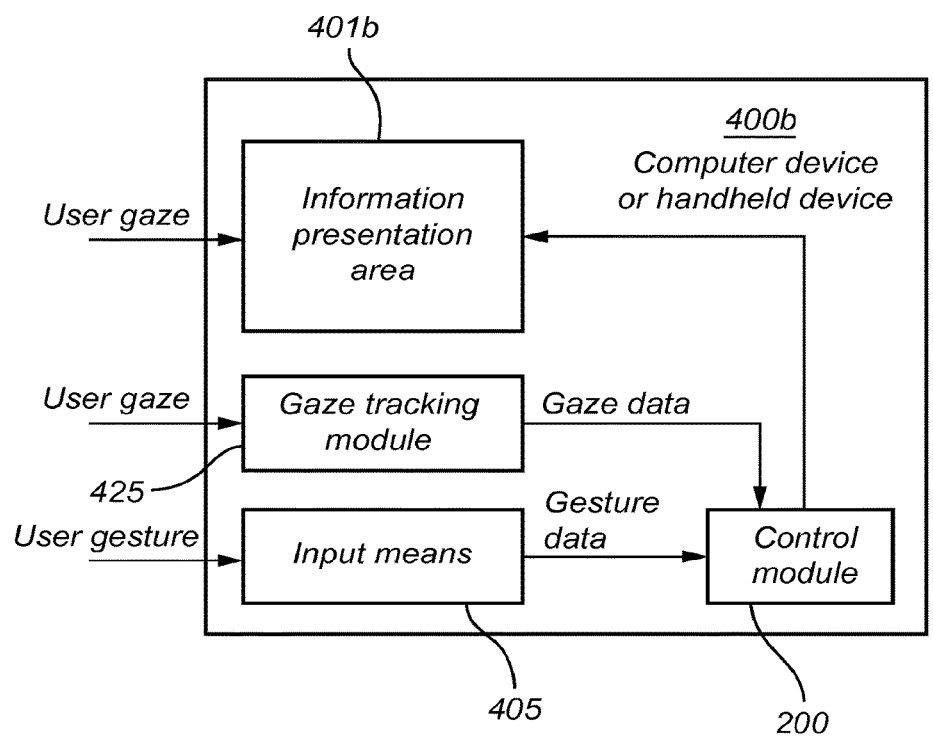
FIG. 15b is a schematic view of another embodiment of a computer device or handheld device in accordance with the present invention.

With reference to FIGS. 15a and 15b, a computer device or handheld portable device in accordance with the present invention will be described. Parts or modules described above will not be described in detail again. Further, only parts or modules related to the present invention will be described below. Accordingly, the device includes a large number of additional parts, units and modules that are not described herein such as memory units (e.g. RAM/ROM), or processing units. The computer device or handheld portable device 400 may, for example, be any one from the group of a personal computer, computer workstation, mainframe computer, a processor or device in a vehicle, or a handheld device such as a cell phone, smartphone or similar device, portable music player (such as e.g. an iPod), laptop computers, computer games, electronic books, an iPAD or similar device, a Tablet, a Phoblet/Phablet.

The computer device or handheld device 400a is connectable to an information presentation area 401a (e.g. an external display or a heads-up display (HUD), or at least one head-mounted display (HMO)), as shown in FIG. 15a, or the computer device or handheld device 400b includes an information presentation area 401b, as shown in FIG. 15b, such as a regular computer screen, a stereoscopic screen, a heads-up display (HUD), or at least one head-mounted display (HMO). Furthermore, the computer device or handheld device 400a, 400b comprises input means 405 adapted to detect user generated gestures and a gaze tracking module 435 adapted to detect gaze data of a viewer of the information presentation area 401. Moreover, the computer device or handheld device 400a, 400b comprises a control module 200, 260, or 280 as described above with reference to FIG. 13a, 13b or 13c. The user is able to control the computer device or handheld device 400a, 400b at least partly based on an eye-tracking signal which described the user's point of regard x, y on the information presentation area or display 401 and based on user generated gestures, i.e. a movement of at least one body part of the user can be detected, generating gesture based control commands via user input means 405 such as a touchpad. All user actions described in the context of this application may also be executed with this embodiment of the present invention.

With reference now to FIG. 16-19, example embodiments of methods according to the present invention will be described. The method embodiments described in connection with FIGS. 16-19 are implemented in an environment where certain steps are performed in a device, e.g. a WTRU described above with reference to FIG. 14, or a computer device or handheld device described above with reference to FIG. 15a or 15b and certain steps are performed in a control module, e.g. a control module as described above with reference to FIGS. 13a, 13b and 13c. As the skilled person realizes, the methods described herein can also be implemented in other environments, as, for example, in a system as described above with reference to FIGS. 2, 3 and 20 or in implementations illustrated in FIGS. 21-23. Similar or like steps performed in the different embodiments will be denoted with the same reference numeral hereinafter.

Figure 16:
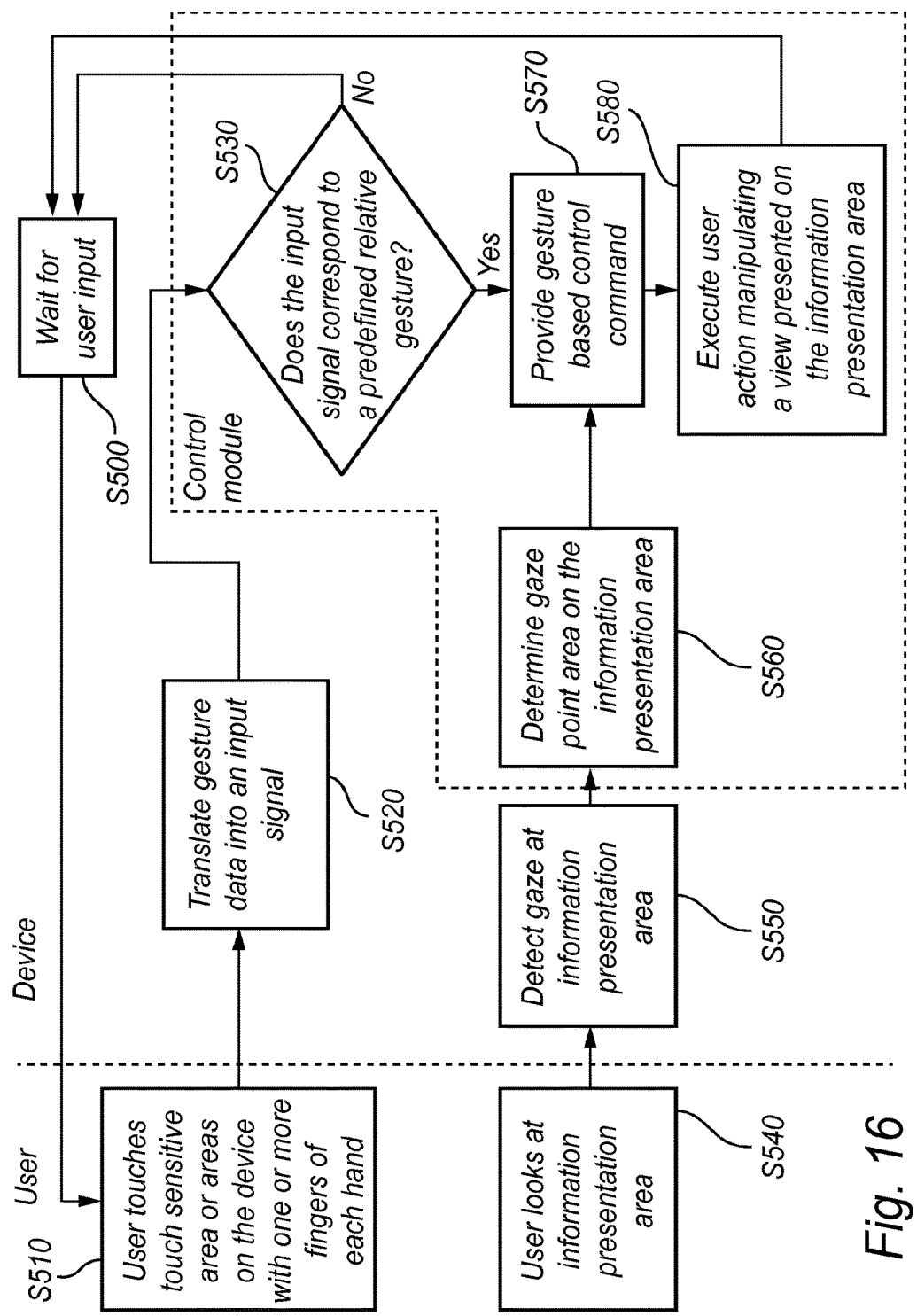
FIG. 16 is a schematic flow chart illustrating steps of an embodiment of a method in accordance with an embodiment of the present invention.

With reference first to FIG. 16, the device is waiting for user input in step S500. In step S510, the user touches a touch sensitive area on the device (e.g. input means as described above) with one or more fingers of each hand. This step is not a part of the method according to embodiments of the invention. There are a large number of conceivable gestures that the user can use to control actions of the device, and a non-exhaustive number of such gestures have been described above. At step S520, the gesture data, i.e. the user input, is translated into an input signal. At step S530, it is checked whether the input signal corresponds to a predefined or predetermined relative gesture. If not, the procedure returns back to step S500. On the other hand, if yes (i.e. the input signal corresponds to a predefined gesture), a gesture based control command is generated at step S570. At step S540, the user looks at a screen or an information presentation area and at step S550 the user's gaze is detected at the information presentation area. The step S540 is not a part of the method according to embodiments of the present invention. In step S560, a gaze point area including a user's point of gaze on the screen or information presentation area. At step S580, an action corresponding to the relative gesture at the user's point of gaze is performed based on the gesture based control command and the determined gaze point at the information presentation area.

Figure 17:
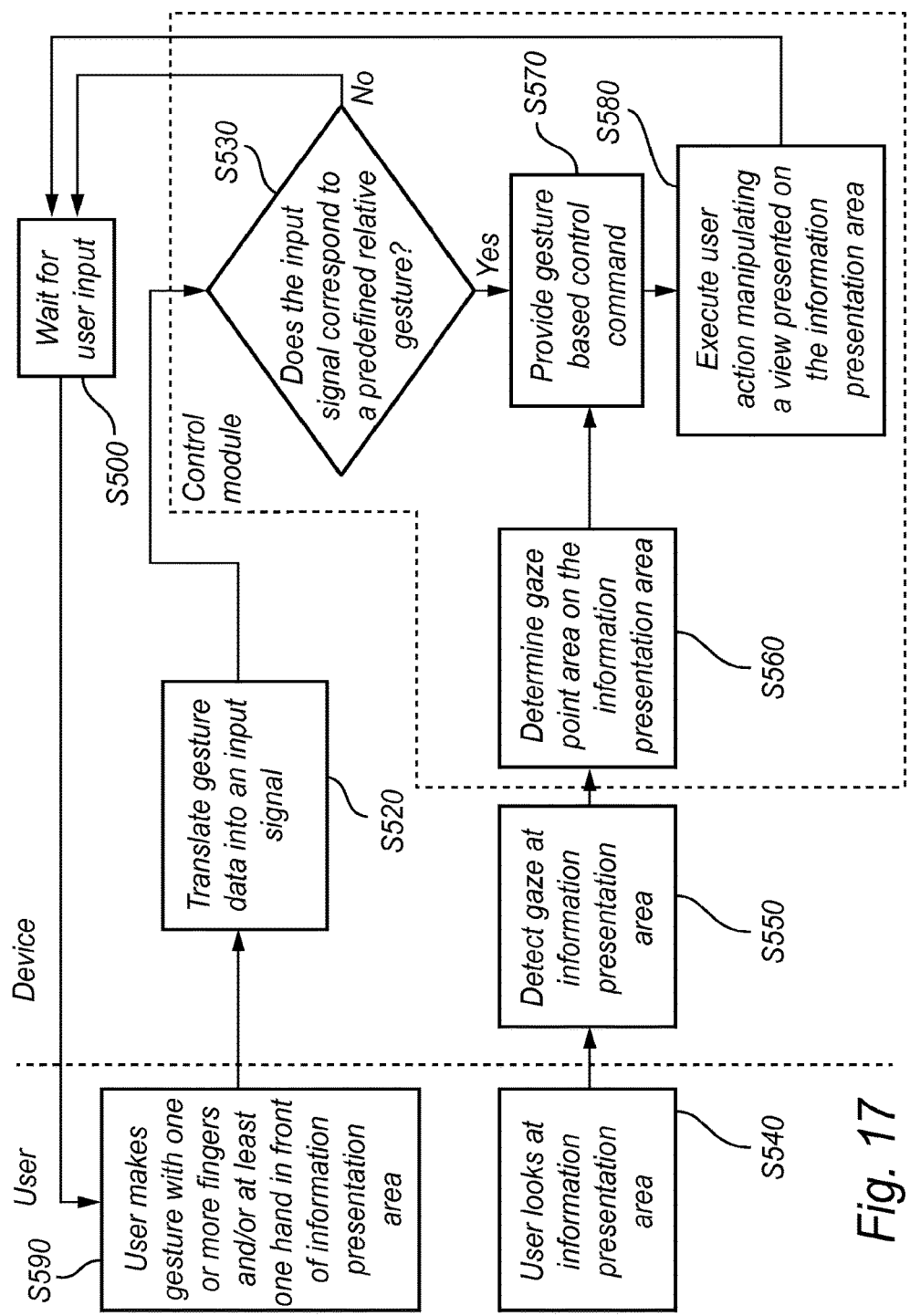
FIG. 17 is a schematic flow chart illustrating steps of another embodiment of a method in accordance with the present invention.

With reference to FIG. 17, the device is waiting for user input in step S500. In step S590, the user makes a gesture with one or more fingers and/or at least one hand in front of the information presentation area (which gesture is interpreted by input means as described above). The step S590 is not a part of the method according to embodiments of the present invention. There are a large number of conceivable gestures that the user can use to control actions of the device, and a non-exhaustive number of such gestures have been described above. At step S520, the gesture data, i.e. the user input, is translated into an input signal. At step S530, it is checked whether the input signal corresponds to a predefined or predetermined relative gesture. If not, the procedure returns back to step S500. On the other hand, if yes (i.e. the input signal corresponds to a predefined gesture), a gesture based control command is generated at step S570. At step S540, the user looks at a screen or an information presentation area and at step S550 the user's gaze is detected at the information presentation area. As mentioned above, the step S540 is not a part of the method according to embodiments of the present invention. In step S560, a gaze point area including a user's point of gaze on the screen or information presentation area. At step S580, an action corresponding to the relative gesture at the user's point of gaze is performed based on the gesture based control command and the determined gaze point at the information presentation area.

Figure 18:
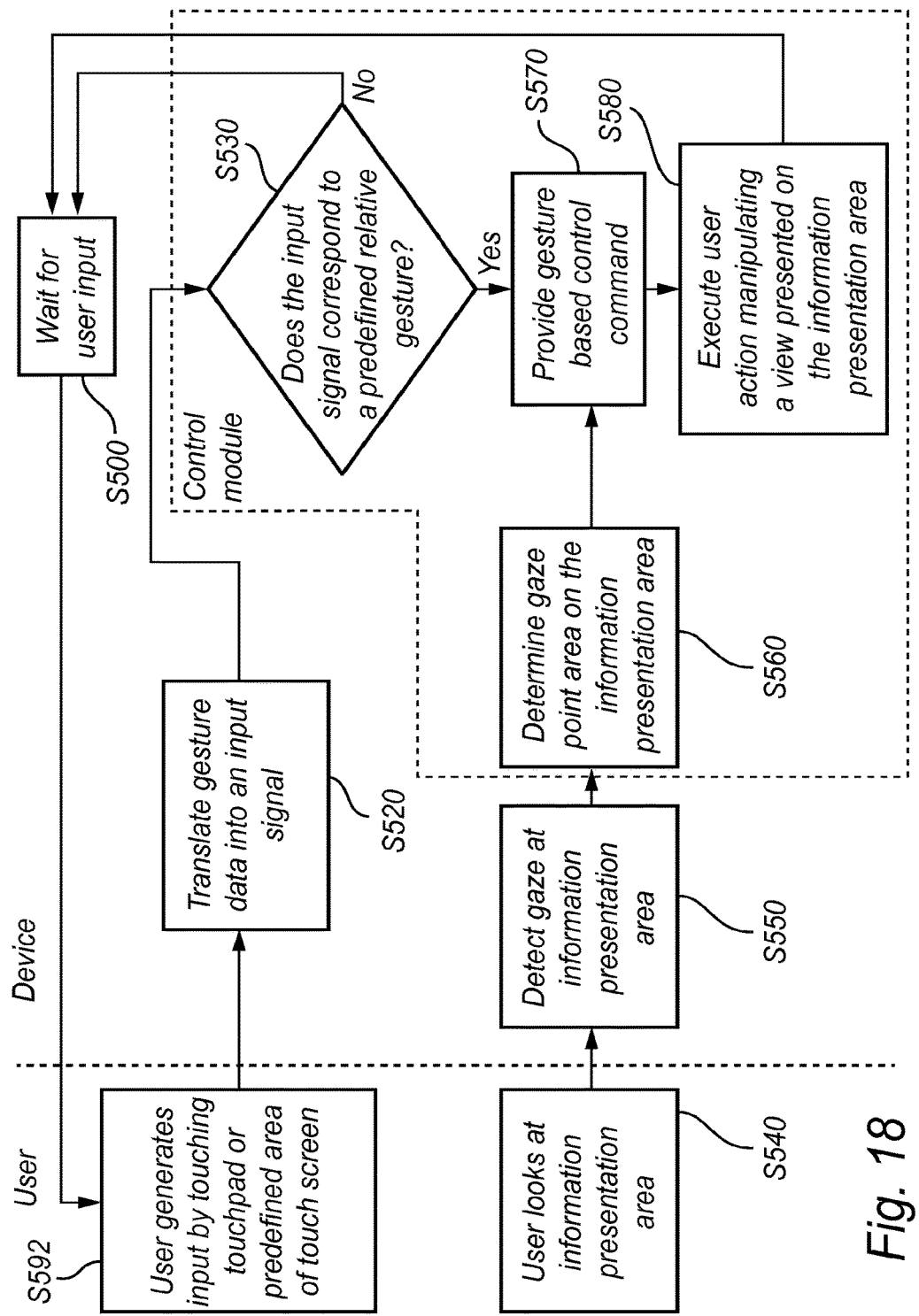
FIG. 18 is a schematic flow chart illustrating steps of a further embodiment of a method in accordance with an embodiment of the present invention.

With reference to FIG. 18, the device is waiting for user input in step S500. In step S592, the user generates input by touching touchpad or predefined area of touch-screen. The step S592 is not a part of the method according to embodiments of the present invention. There are a large number of conceivable gestures that the user can use to control actions of the device, and a non-exhaustive number of such gestures have been described above. At step S520, the gesture data, i.e. the user input, is translated into an input signal. At step S530, it is checked whether the input signal corresponds to a predefined or predetermined relative gesture. If not, the procedure returns back to step S500. On the other hand, if yes (i.e. the input signal corresponds to a predefined gesture), a gesture based control command is generated at step S570. At step S540, the user looks at a screen or an information presentation area and at step S550 the user's gaze is detected at the information presentation area. The step S540 is not a part of the method according to embodiments of the present invention. In step S560, a gaze point area including a user's point of gaze on the screen or information presentation area is determined. At step S580, an action corresponding to the relative gesture at the user's point of gaze is performed based on the gesture based control command and the determined gaze point at the information presentation area.

Figure 19:
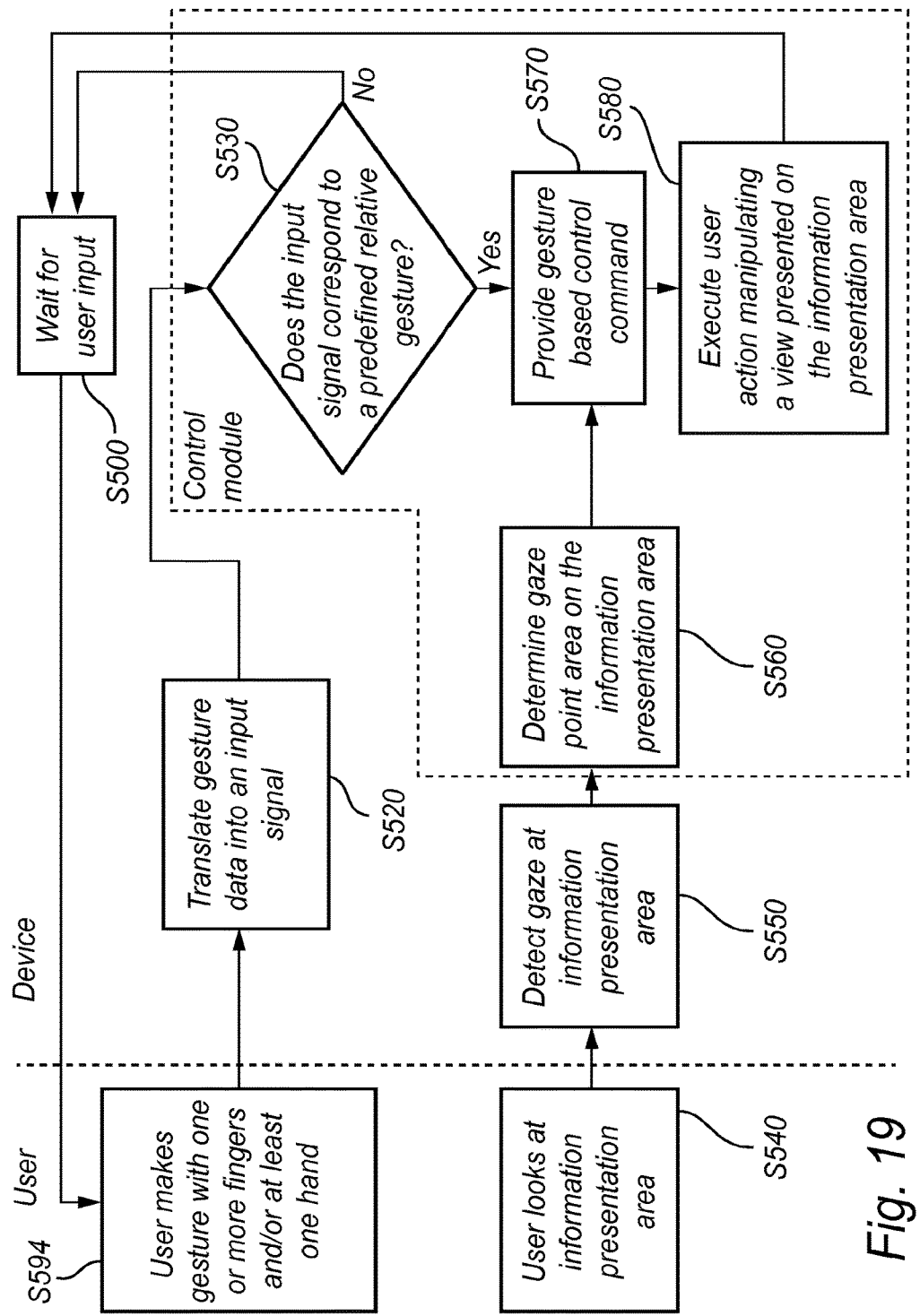
FIG. 19 is a schematic flow chart illustrating steps of another embodiment of a method in accordance with an embodiment of the present invention.

With reference to FIG. 19, the device is waiting for user input in step S500. In step S594, the user generates input by making a gesture with one or more of his or hers fingers and/or at least one hand. The step S594 is not a part of the method according to embodiments of the present invention. There are a large number of conceivable gestures that the user can use to control actions of the device, and a non-exhaustive number of such gestures have been described above. At step S520, the gesture data, i.e. the user input, is translated into an input signal. At step S530, it is checked whether the input signal corresponds to a predefined or predetermined relative gesture. If not, the procedure returns back to step S500. On the other hand, if yes (i.e. the input signal corresponds to a predefined gesture), a gesture based control command is generated at step S570. At step S540, the user looks at a screen or an information presentation area and at step S550 the user's gaze is detected at the information presentation area. The step S540 is not a part of the method according to embodiments of the present invention. In step S560, a gaze point area including a user's point of gaze on the screen or information presentation area is determined. At step S580, an action corresponding to the relative gesture at the user's point of gaze is performed based on the gesture based control command and the determined gaze point at the information presentation area.

Figure 21:
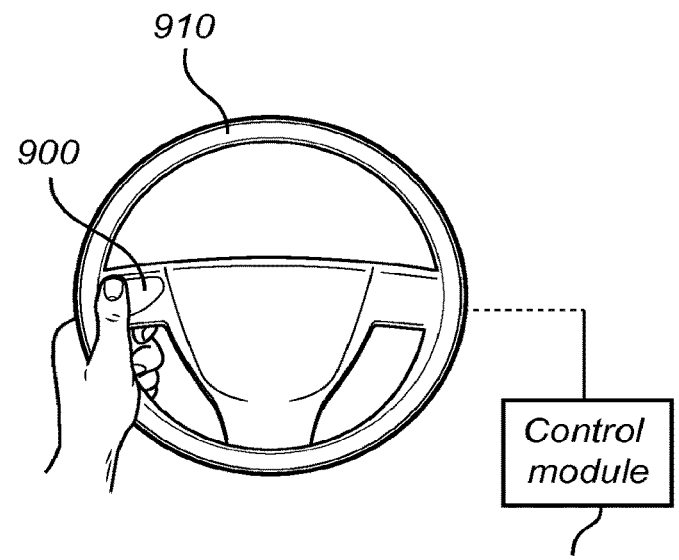
FIG. 21 is a schematic illustration of yet another implementation of the present invention.

With reference to FIG. 21, a further implementation of the present invention will be discussed. A gaze tracking module (not shown) and a user input means 900 are implemented in a vehicle (not shown). The information presentation area (not shown) may be a heads-up display or an infotainment screen. The input means 900 may be one or two separate touch pads on the backside (for use with the index finger/s) or on the front side (for use with the thumb/s) of the steering wheel 910 of the vehicle. A control module 950 is arranged in a processing unit configured to be inserted into a vehicle or a central processing unit of the vehicle. Preferably, the control module is a control module as described with reference to FIGS. 13*a*-13*c*.

Figure 22:
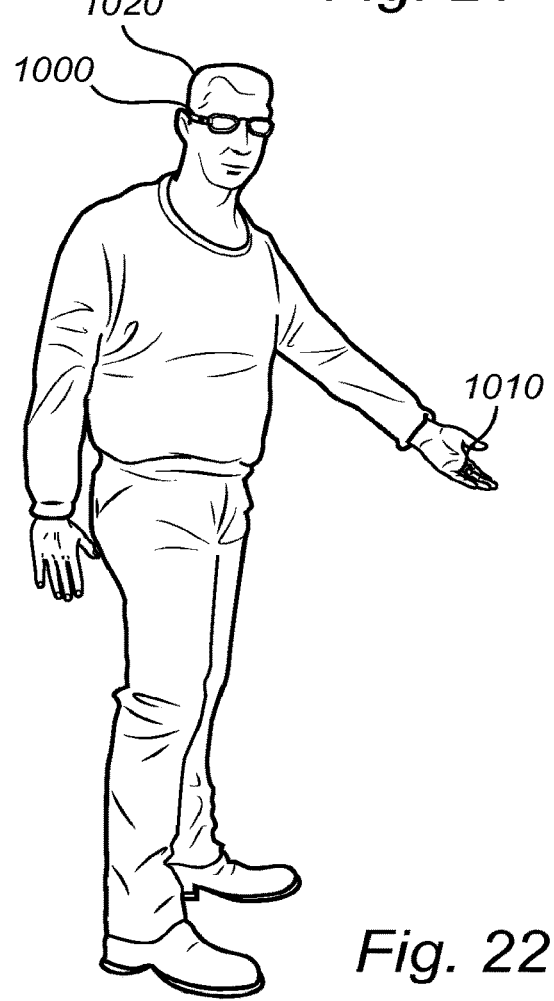
FIG. 22 is a schematic illustration of a further implementation of the present invention.

With reference to FIG. 22, another implementation of the present invention will be discussed. A gaze tracking module (not shown) and an information presentation area (not shown) are implemented in a wearable head mounted display 1000 that may be designed to look as a pair of glasses. One such solution is described in U.S. Pat. No. 8,235,529. The user input means 1010 may include a gyro and be adapted to be worn by the user 1020 on a wrist, hand or at least one finger. For example, the input means 1010 may be a ring with a wireless connection to the glasses and a gyro that detects small movements of the finger where the ring is worn. The detected movements representing gesture data may then wirelessly be communicated to the glasses where gaze is detected and gesture based control commands based on the gesture data from the input means is used to identify and execute user action. Preferably, a control module as described with reference to FIG. 13*a*-13*c* is used with this implementation.

Figure 23:
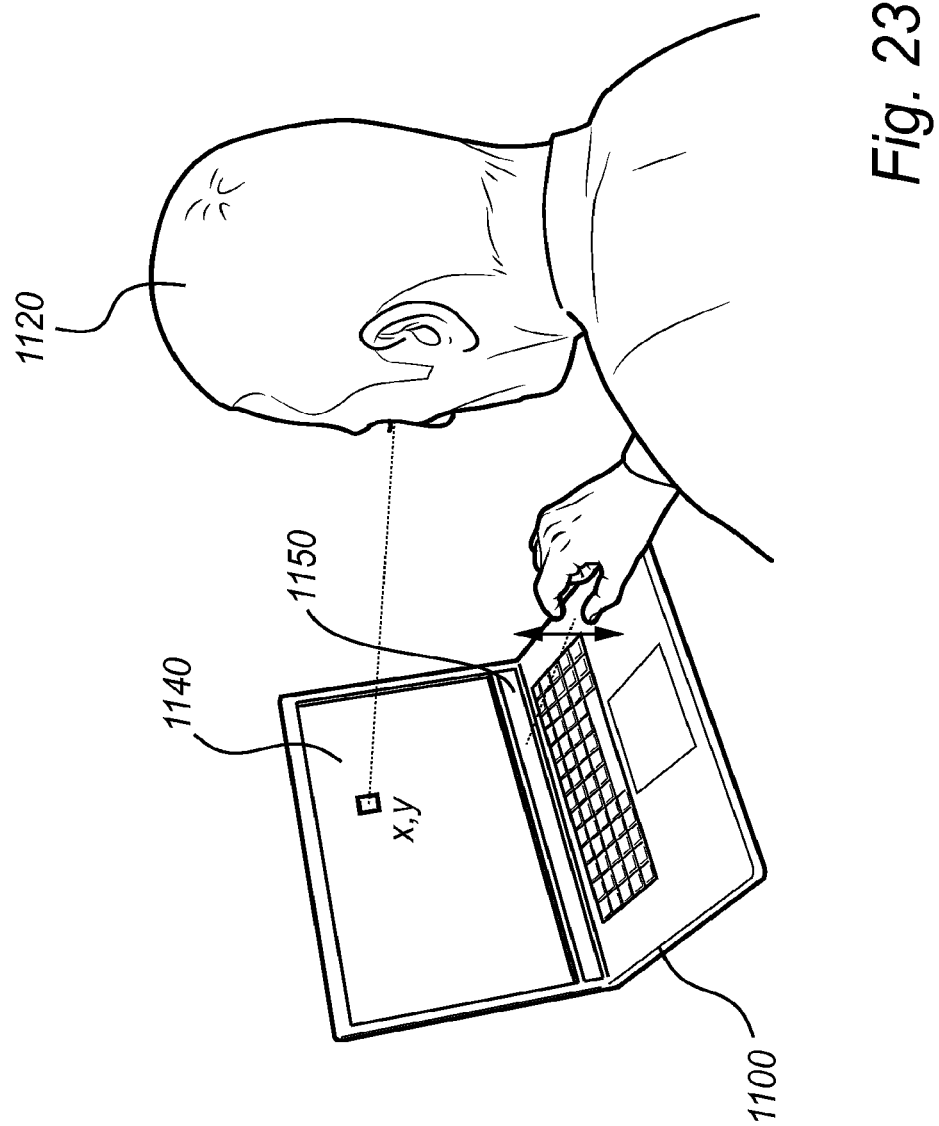
FIG. 23 is a schematic illustration of an implementation of the present invention.

With reference to FIG. 23, an implementation of the present invention will be discussed. In this implementation, the user 1120 is able to control a computer device 1100 at least partly based on an eye-tracking signal which describes the user's point of regard x, y on an information presentation area 1140 and based on user generated gestures, i.e. a movement of at least one body part of the user can be detected, generating gesture based control commands via user input means 1150. In this embodiment, the user 1120 can generate the gesture based control commands by performing gestures above or relative the keyboard of the computer device 1100. The input means 1140 detects the gestures, for example, using an optical measurement technique or capacitive measurement technique. Preferably, a control module as described with reference to FIGS. 13*a*-13*c* is used with this implementation and may be arranged in the computer device 1100. The computer device 1100 may, for example, be any one from the group of a personal computer, computer workstation, mainframe computer, or a handheld device such as a cell phone, portable music player (such as e.g. an iPod), laptop computers, computer games, electronic books and similar other devices. The present invention may also be implemented in an "intelligent environment" where, for example, objects presented on multiple displays can be selected and activated. In order to produce the gaze tracking signals, a gaze tracker unit (not shown) is included in the computer device 1100, or is associated with the information presentation area 1140. A suitable gaze tracker is described in the U.S. Pat. No. 7,572,008, titled "Method and Installation for detecting and following an eye and the gaze direction thereof", by the same applicant, which hereby is incorporated in its entirety. While this specification contains a number of specific embodiments, these should not be construed as limitation to the scope of the present invention or of what may be claimed, but rather as descriptions of features specific to exemplary implementations of the present invention. Certain features that are described in this specification in the context of separate implementations can also be implemented in combinations in a single implementation. Conversely, various features that are described in the context of a single implementation can also be implemented in multiple implementations separately or in any suitable sub-combination. Moreover, although feature may be described above as acting in certain combinations or even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as require such operations be performed in the particular order shown or in sequential order, or that all illustrated operation be performed to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

The invention claimed is:

1. A system for generating gesture based commands during user interaction with an information presentation area, the system comprising:
a processor; and
a memory storing computer-readable instructions that, upon execution by the processor, configure the system to:
receive gaze data from a gaze tracking module, the gaze data indicating a gaze point of a user on the information presentation area;
receive, from an input device, first user gesture data;
determine, based on the first user gesture data and the gaze data, a gaze point area on the information presentation area, the gaze point area including the gaze point;
receive, from the input device, second user gesture data, the second user gesture data received subsequently to receiving the first user gesture data and while the user gaze data are received; and
execute at least one user action manipulating the gaze point area based on the second user gesture data, the user action comprising resizing the gaze point area to generate an updated gaze point area, the updated gaze point area including the gaze point and overlapping with the gaze point area.

2. The system of claim 1, wherein the input device comprises a physical touch sensitive area, wherein the first user gesture data corresponds to a press of a finger on the physical touch sensitive area, and wherein the second user gesture data corresponds to a movement of the finger on the physical touch sensitive area.

3. The system of claim 2, wherein the execution of the computer-readable instructions further configure the system to:
receive, from the input device, third user gesture data indicating a release of the finger from the physical touch sensitive area, the movement of the finger followed next by the release of the finger;
determine, based on an object being included in the updated gaze point area, that the third user gesture data is associated with a select command to select the object; and
select, based on the select command, the object in the updated gaze point area.

4. The system of claim 3, wherein the execution of the computer-readable instructions further configure the system to:
receive, from the input device, fourth user gesture data indicating a first finger press on the physical touch sensitive area; and
present, at the gaze point, an icon illustrating a location of the gaze point on the information presentation area.

5. The system of claim 4, wherein the execution of the computer-readable instructions further configure the system to:
receive, from the input device, fifth user gesture data indicating a finger movement on the physical touch sensitive area, the first finger press followed next by the finger movement;
determine, based on the icon, that the fifth gesture data is associated with a relocation command to relocate the gaze point to a new location on the information presentation area; and
relocate, based on the relocation command, the gaze point from the location to the new location.

6. The system of claim 5, wherein the execution of the computer-readable instructions further configure the system to:
receive, based on the relocating, sixth user gesture data indicating a second finger press concurrent with the first finger press, the finger movement followed next by the second finger press; and
manipulate the object based on the sixth user gesture data and the new location of the gaze point.

7. The system of claim 2, wherein the execution of the computer-readable instructions further configure the system to:
receive, from the input device, third user gesture data indicating a finger tap on the physical touch sensitive area, the movement of the finger followed next by the finger tap;
determine, based on an object being included in the updated gaze point area, that the third user gesture data is associated with a select command to select the object; and
select, based on the select command, the object in the updated gaze point area.

8. The system of claim 1, wherein the input device comprises a physical touch sensitive area, wherein the first user gesture data corresponds to a press of a finger on the physical touch sensitive area, wherein the second user gesture data corresponds to a circular movement of the finger on the physical touch sensitive area, and wherein the user action comprises a zoom in or a zoom out depending on a direction of the circular movement.

9. The system of claim 1, wherein the input device comprises a physical touch sensitive area, wherein the first user gesture data corresponds to a press of a finger on the physical touch sensitive area, wherein the second user gesture data corresponds to holding the press of the finger and a movement of a different finger on the physical touch sensitive area, and wherein the user action comprises a zoom in or a zoom out depending on a direction of the movement.

10. The system of claim 1, wherein the input device comprises a physical touch sensitive area, wherein the first user gesture data corresponds to a press of two fingers on the physical touch sensitive area, wherein the second user gesture data corresponds to movement of the two fingers in opposite direction on the physical touch sensitive area, and wherein the user action comprises a zoom in or a zoom out.

11. The system of claim 1, wherein the input device comprises a physical touch sensitive area, wherein the first user gesture data corresponds to a finger tap on the physical touch sensitive area, wherein the second user gesture data corresponds to holding the press of the finger and a movement of a different finger on the physical touch sensitive area, and wherein the user action comprises sliding the information presentation area.

12. The system of claim 1, wherein the input device comprises a physical touch sensitive area, wherein the first user gesture data corresponds to a finger tap on the physical touch sensitive area, wherein the second user gesture data corresponds to a different touch on the physical touch sensitive area, and wherein the user action comprises panning the information presentation area based on the gaze point.

13. The system of claim 1, wherein the input device comprises a physical touch sensitive area, wherein the gaze point corresponds to an object in the presentation area, wherein the first user gesture data corresponds to a press of two fingers on the physical touch sensitive area, wherein the second user gesture data corresponds to movement of the two fingers in opposite direction on the physical touch sensitive area, and wherein the user action comprises rotating the object.

14. The system of claim 1, wherein the execution of the computer-readable instructions further configure the system to present, based on the first user gesture data and prior to receiving the second user gesture data, a virtual finger on the information presentation area, wherein the second user gesture data corresponds to a selection and movement of the virtual finger on the information presentation area.

15. The system of claim 14, wherein the execution of the computer-readable instructions further configure the system to receive, based on the selection and movement of the virtual finger, a third user gesture data indicating a point of action corresponding to an updated location of the virtual finger on the information presentation area, wherein the user action is executed based on the point of action.

16. A method for generating gesture based commands during user interaction with an information presentation area, the method implemented by a computer system and comprising:
    receiving gaze data from a gaze tracking module, the gaze data indicating a gaze point of a user on the information presentation area;
    receiving, from an input device, first user gesture data;
    determining, based on the first user gesture data and the gaze data, a gaze point area on the information presentation area, the gaze point area including the gaze point;
    receiving, from the input device, second user gesture data, the second user gesture data received subsequently to receiving the first user gesture data and while the user gaze data are received; and
    executing at least one user action manipulating the gaze point area based on the second user gesture data, the user action comprising resizing the gaze point area to generate an updated gaze point area, the updated gaze point area including the gaze point and overlapping with the gaze point area.

17. The method of claim 16, wherein the input device comprises a physical touch sensitive area, wherein the first user gesture data corresponds to a press of a finger on the physical touch sensitive area, and wherein the second user gesture data corresponds to a movement of the finger on the physical touch sensitive area.

18. The method of claim 17, further comprising:
    receiving, from the input device, third user gesture data indicating a release of the finger from the physical touch sensitive area, the movement of the finger followed next by the release of the finger;
    determining, based on an object being included in the updated gaze point area, that the third user gesture data is associated with a select command to select the object; and
    selecting, based on the select command, the object in the updated gaze point area.

19. A non-transitory computer-readable storage medium storing instructions that, upon execution on a system, cause the system to perform operations comprising:
    receiving gaze data from a gaze tracking module, the gaze data indicating a gaze point of a user on an information presentation area;
    receiving, from an input device, first user gesture data;
    determining, based on the first user gesture data and the gaze data, a gaze point area on the information presentation area, the gaze point area including the gaze point;
    receiving, from the input device, second user gesture data, the second user gesture data received subsequently to receiving the first user gesture data and while the user gaze data are received; and
    executing at least one user action manipulating the gaze point area based on the second user gesture data, the user action comprising resizing the gaze point area to generate an updated gaze point area, the updated gaze point area including the gaze point and overlapping with the gaze point area.

20. The non-transitory computer-readable storage medium of claim 19, wherein the input device comprises a physical touch sensitive area, wherein the first user gesture data corresponds to a press of a finger on the physical touch sensitive area, wherein the second user gesture data corresponds to a circular movement of the finger on the physical touch sensitive area, and wherein the user action comprises a zoom in or a zoom out depending on a direction of the circular movement.

* * * * *